US012657053B2

(12) United States Patent
Shen

(10) Patent No.: US 12,657,053 B2
(45) Date of Patent: Jun. 16, 2026

(54) METHOD FOR DATA PROCESSING TO IMPROVE BALANCE OF RESOURCE OCCUPATION AND RESOURCE UTILIZATION RATE OF COMMUNICATION DEVICE

(71) Applicant: GUANGDONG OPPO MOBILE TELECOMMUNICATIONS CORP., LTD., Dongguan (CN)

(72) Inventor: Jia Shen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 651 days.

(21) Appl. No.: 17/967,020

(22) Filed: Oct. 17, 2022

(65) Prior Publication Data

US 2023/0047386 A1 Feb. 16, 2023

Related U.S. Application Data

(63) Continuation of application No. PCT/CN2020/085444, filed on Apr. 17, 2020.

(51) Int. Cl.
G06F 9/48 (2006.01)
G06F 9/50 (2006.01)
(52) U.S. Cl.
CPC .......... G06F 9/4881 (2013.01); G06F 9/5027 (2013.01)
(58) Field of Classification Search
CPC ................ G06F 9/4881; G06F 9/5027; G06F 2209/5017; G06F 9/5066; H04W 8/22
(Continued)

(56) References Cited

U.S. PATENT DOCUMENTS 6,546,379 B1 * 4/2003 Hong ..................... G06N 20/20
706/14
7,509,244 B1 * 3/2009 Shakeri .................... G06F 8/41
717/109
(Continued)

FOREIGN PATENT DOCUMENTS

CN 105338297 A 2/2016
CN 106650493 A 5/2017
(Continued)

OTHER PUBLICATIONS

International Search Report in the international application No. PCT/CN2020/085444, mailed on Jan. 15, 2021.
(Continued)

*Primary Examiner* — Adam Lee
(74) *Attorney, Agent, or Firm* — Ladas & Parry, LLP

(57) ABSTRACT

A data processing method and communication device for configuring at least one split mode corresponding to at least one part of data associated with a data processing model. The method further includes: sending available processing resource to a second communication device; acquiring first configuration information from the second communication device; processing the jth part of data by using a sub-processing model corresponding to the ith split mode. The average quantity of processing resources occupied by processing the jth part of data using the first sub-processing model is matched with the available processing resource to improve a balance of resource occupation and a resource utilization rate of the communication device.

20 Claims, 16 Drawing Sheets

(58) Field of Classification Search
USPC ........................................................ 718/104
See application file for complete search history.

(56) References Cited

U.S. PATENT DOCUMENTS

| | | | | |
|---|---|---|---|---|
| 8,595,334 | B2 * | 11/2013 | Robertson | H04L 43/00 709/221 |
| 9,015,681 | B1 * | 4/2015 | Bryan | G06F 8/51 717/141 |
| 10,558,542 | B1 * | 2/2020 | A | G06F 11/3058 |
| 2005/0149940 | A1 * | 7/2005 | Calinescu | G06F 9/5061 718/104 |
| 2011/0078652 | A1 * | 3/2011 | Mani | G06F 8/10 717/105 |
| 2011/0096677 | A1 * | 4/2011 | Kim | H04W 52/146 370/252 |
| 2011/0208841 | A1 * | 8/2011 | Robertson | H04L 41/08 709/220 |
| 2015/0058320 | A1 * | 2/2015 | Zheng | G06F 16/35 707/722 |
| 2015/0149602 | A1 | 5/2015 | Robertson et al. | |
| 2016/0037499 | A1 * | 2/2016 | He | H04B 17/318 370/329 |
| 2016/0066342 | A1 * | 3/2016 | Ma | H04W 74/04 370/329 |
| 2016/0080888 | A1 * | 3/2016 | Kreitzer | H04B 7/26 455/39 |
| 2016/0360382 | A1 * | 12/2016 | Gross | G06F 9/453 |
| 2017/0109219 | A1 * | 4/2017 | Höfig | G05B 23/0283 |
| 2017/0187571 | A9 | 6/2017 | Robertson et al. | |
| 2017/0346681 | A1 | 11/2017 | Robertson et al. | |
| 2018/0184426 | A1 * | 6/2018 | Li | H04W 72/0446 |
| 2018/0212663 | A1 * | 7/2018 | Liu | H04W 72/044 |
| 2018/0336509 | A1 * | 11/2018 | Guttmann | G06F 16/24565 |
| 2019/0036769 | A1 * | 1/2019 | Nakao | H04L 41/0803 |
| 2019/0074947 | A1 * | 3/2019 | Zhang | H04L 5/0048 |
| 2019/0230726 | A1 * | 7/2019 | Jin | H04W 76/11 |
| 2019/0244402 | A1 * | 8/2019 | Hua | G06F 16/2465 |
| 2019/0349979 | A1 * | 11/2019 | Park | H04W 72/54 |
| 2020/0022171 | A1 * | 1/2020 | Guan | H04B 7/0695 |
| 2020/0044916 | A1 * | 2/2020 | Kaufman | H04L 41/0803 |
| 2020/0119858 | A1 * | 4/2020 | Ren | H04L 1/1864 |
| 2020/0204628 | A1 * | 6/2020 | Desai | H04L 41/14 |
| 2020/0250441 | A1 * | 8/2020 | Lota | H04W 4/025 |
| 2020/0285940 | A1 * | 9/2020 | Sprechmann | G06N 3/02 |
| 2020/0342322 | A1 * | 10/2020 | Han | G06N 3/10 |
| 2021/0142210 | A1 * | 5/2021 | Cheng | G06V 10/764 |
| 2022/0043688 | A1 * | 2/2022 | Lai | G06N 3/105 |
| 2023/0362953 | A1 * | 11/2023 | Yuan | H04L 5/0053 |

FOREIGN PATENT DOCUMENTS

| | | |
|---|---|---|
| CN | 106844018 A | 6/2017 |
| CN | 107295360 A | 10/2017 |
| CN | 109598184 A | 4/2019 |

OTHER PUBLICATIONS

Written Opinion of the International Search Authority in the international application No. PCT/CN2020/085444, mailed on Jan. 15, 2021.

Ke-Jou Hsu et al, "Couper : DNN model slicing for visual analytics containers at the edge", Proceedings of the 4th ACM/IEEE Symposium on Edge Computing, Arlington, VA, USA, Nov. 7, 2019 (Nov. 7, 2019), pp. 179-194, New York, NY, USA. DOI: 10.1145/3318216.3363309, ISBN: 978-1-4503-6733-2. 16 pages.

Supplementary European Search Report in the European application No. 20930985.5, mailed on May 12, 2023. 7 pages.

* cited by examiner

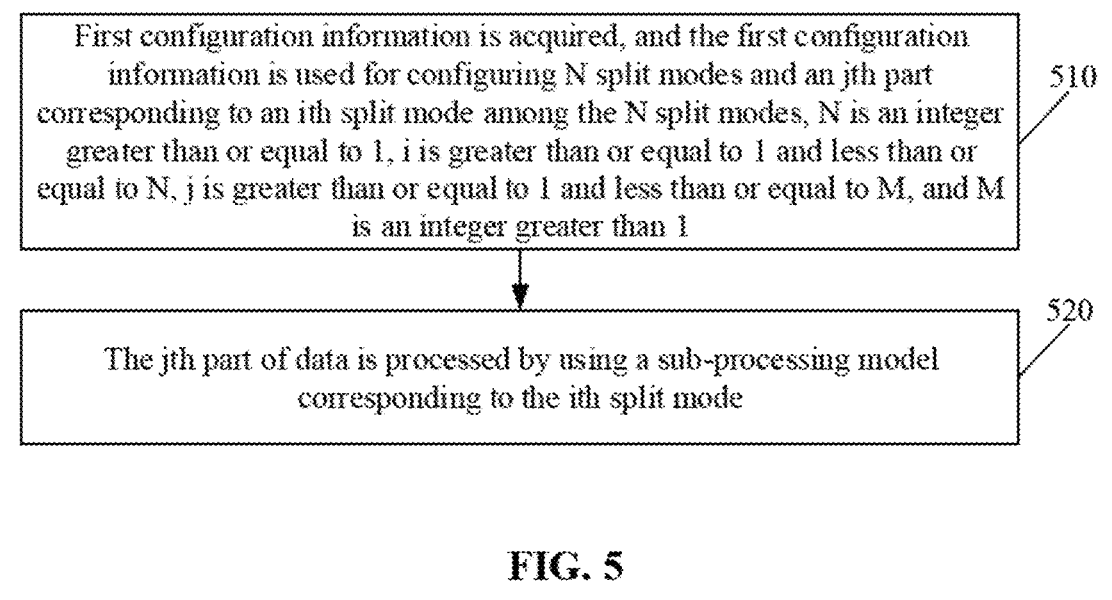

First configuration information is acquired, and the first configuration information is used for configuring N split modes and an jth part corresponding to an ith split mode among the N split modes, N is an integer greater than or equal to 1, i is greater than or equal to 1 and less than or equal to N, j is greater than or equal to 1 and less than or equal to M, and M is an integer greater than 1    510

The jth part of data is processed by using a sub-processing model corresponding to the ith split mode    520

FIG. 5

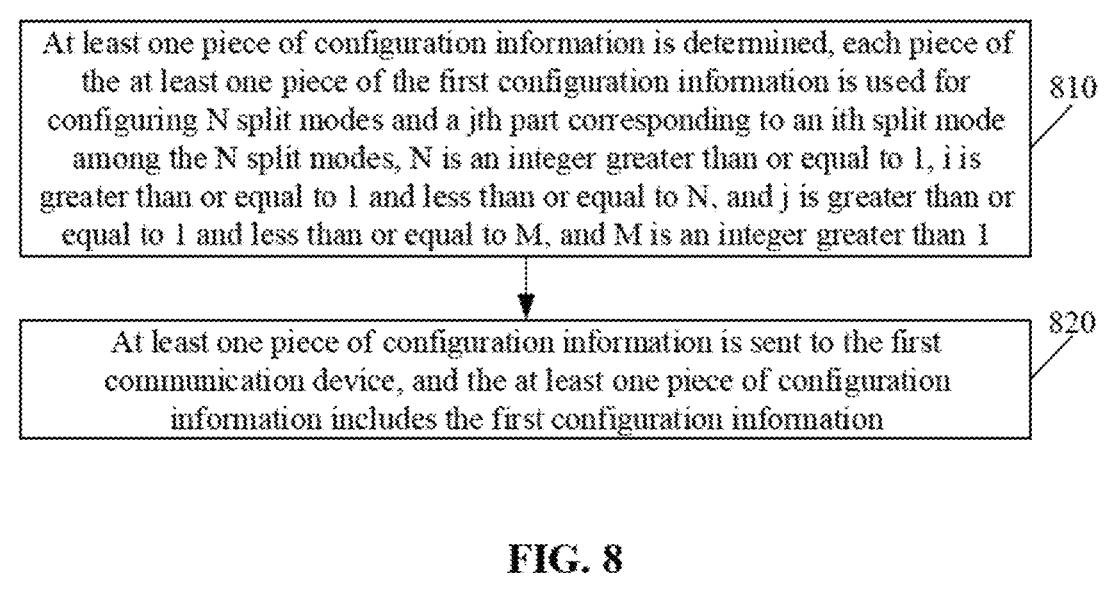

At least one piece of configuration information is determined, each piece of the at least one piece of the first configuration information is used for configuring N split modes and a jth part corresponding to an ith split mode among the N split modes, N is an integer greater than or equal to 1, i is greater than or equal to 1 and less than or equal to N, and j is greater than or equal to 1 and less than or equal to M, and M is an integer greater than 1    810

At least one piece of configuration information is sent to the first communication device, and the at least one piece of configuration information includes the first configuration information    820

FIG. 8

METHOD FOR DATA PROCESSING TO IMPROVE BALANCE OF RESOURCE OCCUPATION AND RESOURCE UTILIZATION RATE OF COMMUNICATION DEVICE

CROSS-REFERENCE TO RELATED APPLICATION

This is a continuation of International Patent Application No. PCT/CN2020/085444, filed on Apr. 17, 2020, the disclosure of the above reference application is hereby incorporated by reference in its entirety.

BACKGROUND

With the development of computer science and technology, a data processing technology based on an Artificial Intelligence (AI)/Machine Learning (ML) model takes more and more important tasks in terminals, such as an image recognition task based on the AI/ML model, a video call processing task, and an augmented reality or virtual reality task. It can be predicted that the transmission of the data of the AI/ML model in the future mobile communication network (such as a 5G network) in the future will become an important service.

At present, the data processing of the AI/ML model can be implemented through the cooperation between a terminal and a network device or other terminals. Specifically, the AI/ML model can be segmented into a plurality of sub-models. The terminal performs data processing through part of the plurality of sub-models. The network device or other terminals perform data processing through other part of the plurality of sub-models. However, the AI/ML model are split in a fixed manner in the prior art. That is to say, all data of the data to be processed is processed in the fixed split mode, which causes that in some cases, available processing resources of the terminal cannot meet the size of resources occupied by the fixed split mode. Therefore, the data processing performed in the fixed split mode will cause a problem of unbalanced resource occupation.

SUMMARY

The present disclosure relates to the technical field of communication, and in particular to a method for data processing and a communication device, which improve the balance of resource occupation in a data processing process and a resource utilization rate in the data processing process.

A first aspect of the embodiments of the present disclosure provides a method for data processing, which is applied in a first communication device and includes the following operation.

First configuration information is acquired. The first configuration information is used for configuring N split modes and a jth part corresponding to an ith split mode among the N split modes. N is an integer greater than or equal to 1, i is greater than or equal to 1 and less than or equal to N, j is greater than or equal to 1 and less than or equal to M, and M is an integer greater than 1.

The N split modes includes a split mode for splitting a data processing model into at least two sub-processing models by presetting a split position.

A second aspect of the embodiments of the present disclosure provides a communication device, which includes a second transceiver, a second processor and a second memory storing a computer program. The second transceiver, the second processor and the second memory communicate with one another through a communication bus. The second processor is configured to execute the computer program to implement the following operations.

At least one piece of configuration information is determined. Each piece of the at least one piece of the configuration information is used for configuring N split modes and a jth part corresponding to an ith split mode among the N split modes. N is an integer greater than or equal to 1, i is greater than or equal to 1 and less than or equal to N, j is greater than or equal to 1 and less than or equal to M, and M is an integer greater than 1.

The N split modes includes a split mode for splitting a data processing model into at least two sub-processing models by presetting a split position.

The second transceiver is controlled to send at least one piece of configuration information to the first communication device. The at least one piece of configuration information includes first configuration information.

A third aspect of the embodiments of the present disclosure provides a communication device.

The communication device includes a first transceiver, a first processor, and a first memory storing a computer program.

The first transceiver, the first processor and the first memory communicate with one another through a communication bus.

The first processor is configured to execute the computer program to implement acquiring first configuration information. The first configuration information is used for configuring N split modes and a jth part corresponding to an ith split mode among the N split modes, N is an integer greater than or equal to 1. i is greater than or equal to 1 and less than or equal to N, and j is greater than or equal to 1 and less than or equal to M, M is an integer greater than 1. The N split modes includes a split mode for splitting a data processing model into at least two sub-processing models by presetting a split position. The first processor is further configured to execute the computer program to implement: processing the jth part of data by using the sub-processing model corresponding to the ith split mode.

BRIEF DESCRIPTION OF THE DRAWINGS

FIG. 5 illustrates a schematic first flowchart of a method data processing provided by an embodiment of the present disclosure.

FIG. 8 illustrates a second schematic flowchart of a method for data processing provided by an embodiment of the present disclosure.

DETAILED DESCRIPTION

To make the objective, technical solutions, and advantages of the present disclosure clearer, implementation modes of the present disclosure are further described in detail with reference to the drawings. The attached drawings are for reference only and are not intended to limit the embodiments of the disclosure.

It is to be noted that the terms "first", "second" and the like in the specification, claims and the abovementioned drawings of the present disclosure are used to distinguish different objects, but not used to describe a specific sequence. In addition, the terms "include" and "have" and any variations thereof are intended to cover non-exclusive inclusions. For example, a process, method, system, product or device that contains a series of steps or units is not limited to the listed steps or units, but optionally also includes steps or units that are not listed, or optionally includes other inherent steps or units to these processes, methods, products or devices.

Figure 1:
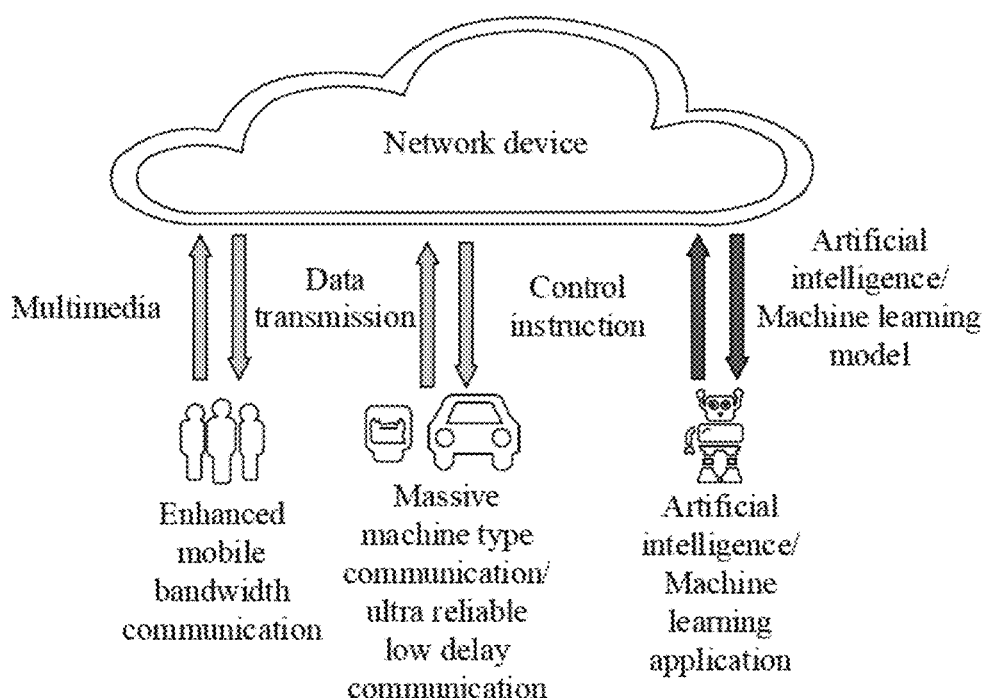
FIG. 1 illustrates a schematic diagram of a communication network data transmission scenario provided by an embodiment of the present disclosure.

Referring to the schematic diagram of a communication network data transmission scenario shown in FIG. 1, the following application scenarios can be involved in a future communication network: enhanced Mobile Broadband Communication (eMBB), massive Machine Type Communication (mMTC). Ultra Reliable Low Delay Communication (URLLC), and AI/ML application. The eMBB can support transmission of large data traffic between a terminal and a network device (for example, a 5G cloud or a 5G edge computing device), for example, the transmission of multimedia data, such as video and audio, between the terminal and the network device. In addition, the mMTC/URLLC supports low-delay and high-reliability data transmission between a large number of terminals and network devices, such as the transmission of sensing data and control instructions between a terminal, for example, a remote sensor and an intelligent vehicle, and a network device. The AI/ML application can support the transmission of the AI/ML model between the terminal and the network device.

In practical applications, for a terminal, the AI/ML application faces three major challenges, which are described as follows.

The first challenge is that the terminal lacks the computing resources, storage resources, and battery capacity required to locally run the AI/ML model fully.

The second challenge is how does the terminal obtain the required AI/ML model in real time under changeable AI/ML data service and network environments when executing the AI/ML application locally.

The third challenge is how the terminal participates in the training of the AI/ML model.

Figure 2:
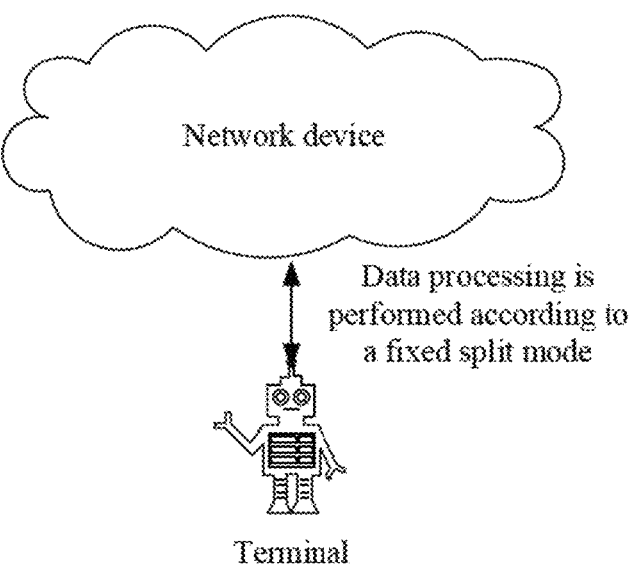
FIG. 2 illustrates a schematic diagram of network architecture unloaded by an AIL operation provided by an embodiment of the present disclosure.

For the first challenge, the 3rd generation partnership project (3rd GPP) has designed a solution, that is, the ANIL model is completely unloaded to a network side (for example, a 5G cloud, or a 5G edge) for operation. Referring to the schematic diagram of network architecture unloaded by an AI/ML operation as shown in FIG. 2, in the network structure, the network device needs to perform the operation of the ANIL model, and also needs to serve as a control node to process the data sent by the terminal and send a control instruction to the terminal.

Extremely low terminal to terminal loop back delay is required in a future communication network. To completely unload the ANIL model to the network side for operation, and to achieve millisecond-level loop back delay, not only the terminal and the network device are required to support the URLLC, but also the ubiquitous MEC deployment and complete network coverage are required. However, these requirements are difficult to realize for 5G networks using the millimeter wave frequency band. Therefore, it is essential to locally perform an operation of the AI/ML model at the terminal. In addition, it is possible to bring a risk of privacy leakage by completely unloading the AI/ML model to the network side, because it is possible to bring the risk of privacy leakage by uploading local data to the network side by a plurality of terminals, and the privacy protection laws and regulations and the wishes of users are violated.

Figure 3:
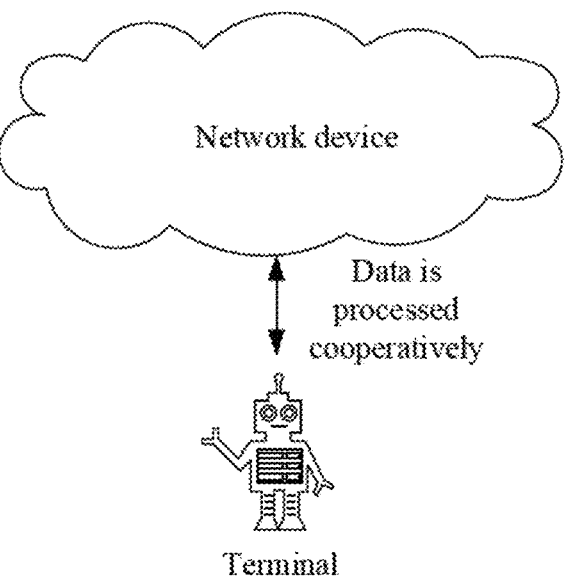
FIG. 3 illustrates a schematic diagram of network architecture of a terminal cooperating with a network device for performing an operation of an AI/ML model provided by an embodiment of the present disclosure.

At present, a feasible method is that the terminal cooperates with the network device to implement the operation of the AI/ML model. Referring to a schematic diagram of network architecture of a terminal cooperating with a network device for performing the operation of the AI/ML model provided by an embodiment of the present disclosure shown in FIG. 3, the AI/ML model may be split into a plurality of sub-models. The terminal performs data processing through part of the plurality of sub-models, and transmits an obtained processing result to the network device. The network device performs data processing through other part of the plurality of sub-models. Thus, the terminal and the network device process the data cooperatively.

However, the AI/ML model is split fixedly in the prior art. That is to say, all data of the data to be processed is processed in the fixed split mode, which causes that in some cases, available processing resources of the terminal cannot meet the size of the resources occupied by the fixed split mode. Therefore, the data processing performed in the fixed split mode will cause a problem of unbalanced resource occupation.

Figure 4:
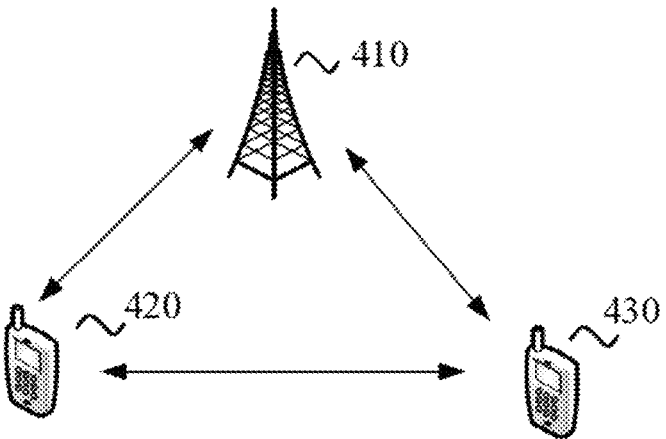
FIG. 4 illustrates a schematic diagram of network architecture of a communication system provided by an embodiment of the present disclosure.

In order to solve the abovementioned problems, the embodiments of the present disclosure provide a method for data processing. FIG. 4 illustrates a schematic diagram of network architecture of a communication system applicable to an embodiment of the present disclosure. The wireless communication system involved in the embodiments of the present disclosure is briefly introduced.

As shown in FIG. 4, network architecture of the communication system includes terminal-to-network communication and device-to-device (D2D) communication. The communication system includes a network device 410, a terminal 420, and a terminal 430. The terminal-to-network communication includes communication between the terminal 420 and the network device 410, or communication between the terminal 430 and the network device 410, and the D2D communication includes the communication between the terminal 420 and the terminal 430.

It should be clear that the network device 410 mentioned in the embodiments of the present disclosure may be a Base Transceiver Station (BTS) in a Global System of Mobile communication (GSM) system or a Code Division Multiple Access (CDMA) system, may also be a NodeB (NB) in a Wideband Code Division Multiple Access (WCDMA) system, or may also be an evolved NodeB (eNB), an access point (AP) or a relay station in a Long Term Evolution (LTE) system, or may also be a base station (such as a gNB or a Transmission Point (TRP)) in a 5G system, or may also be a wireless controller, a wearable device or an on-board device and the like in a Cloud Radio Access Network (CRAN) scenario. There are no limits made thereto herein.

The terminal 420 and the terminal 430 mentioned in the embodiments of the present disclosure may be a User Equipment (UE), an access terminal, a UE unit, a UE station, a mobile console, a mobile station, a remote station, a remote terminal, a mobile device, a UE terminal, a terminal, a wireless terminal device, a user agent, a UE apparatus, or the like. The terminal 420 and the terminal 430 may also be a cellular phone, a cordless phone, a Session Initiation Protocol (SIP) phone, a Wireless Local Loop (WLL) station, a Personal Digital Assistant (PDA), a hand-held device having a wireless communication function, a computing device or other processing devices connected to a wireless modem, an on-board device, an unmanned aerial vehicle, a wearable device, a robot, a terminal in a future 5G network, a terminal in a Public Land Mobile Network (PLMN) in future evolution, or the like. It is to be noted that no limits are made to specific types of the terminal 420 and the terminal 430 in the embodiments of the present disclosure.

It is to be understood that the device with a communication function in a network/a system in the embodiments of the present disclosure may be collectively referred to as a communication device. Taking the network architecture of the communication system as shown in the FIG. 4 as an example, the communication device may include the network device 410, the terminal 420, and the terminal 430 with the communication function.

Based on the schematic diagram of the network architecture of the communication system as shown in FIG. 4, the embodiments of the present disclosure provide a method for data processing. An execution entity of the method for data processing is a first communication device. Here, the first communication device may be any one of the network device 410, the terminal 420 and the terminal 430 as shown in FIG. 4. In a feasible example, when the first communication device is the network device 410, the second communication device is the terminal 420 or the terminal 430. In another feasible example, when the first communication device is the terminal 420, the second communication device may be the network device 410 or the terminal 430. In yet another feasible example, when the first communication device is the terminal 430, the second communication device may be the network device 410 or the terminal 420.

Referring to the first flowchart of a method for data processing as shown in FIG. 5, the method for data processing includes the following operation S510.

At S510, first configuration information is acquired.

The first configuration information is used for configuring N split modes and a jth part corresponding to an ith split mode among the N split modes. N is an integer greater than or equal to 1, i is greater than or equal to 1 and less than or equal to N, j is greater than or equal to 1 and less than or equal to M, and M is an integer greater than 1.

Herein, the N split modes may be split modes for splitting a data processing model into at least two sub-processing models by presetting a split position.

The data processing model mentioned in the embodiments of the present disclosure may be any type of AI/ML model, such as an AI/ML model for image recognition, an AI/ML model for natural language recognition and the like, which is not limited in the embodiments of the present disclosure.

It is to be noted that there may be a plurality of optional preset split positions for the data processing model, that is to say, there are a plurality of preset split modes for the data processing model. In the embodiments of the present disclosure, the N split modes in the first configuration information may be one or more of the plurality of preset split modes, which is not limited in the embodiments of the present disclosure.

In the embodiments provided by the present disclosure, the first communication device may further determine that the data is split into M parts through the first configuration information. Here, data refers to data that needs to be processed through the data processing model (the data may also be referred to as data to be processed). In the embodiments provided by the present disclosure, the data may be any type of data, such as video data, text data, audio data and the like, which is not limited in the embodiments of the present disclosure.

It is to be understood that the part mentioned in the embodiments of the present disclosure refers to a part of the data, and a combination of M parts in the embodiments of the present disclosure is the whole data.

It is to be noted that each part of the data may be composed of discrete data units, that is to say, the data units in each part of the data are not continuous. For example, for the video data, the video data may be split into two parts. Odd frames of the video data constitute a first part and even frames of the video data constitute a second part.

Herein, the data unit mentioned above refers to a minimum unit for processing data. In a feasible example, when the data is video data, the data unit refers to an image frame, that is to say, the data may be split into image frames for processing. In another feasible example, when the data is text data, the data may be split into segments of data with fixed size (10K) for processing. Here, a segment of data with the fixed size is a data unit.

Further, the first configuration information may configure the jth part corresponding to the ith split mode of the N split modes, that is to say, the first configuration information may further configure a corresponding part for each split mode of the N split modes.

It is to be understood that different parts of the data correspond to different split modes. In the embodiments provided by the present disclosure, the correspondences here refers to that data of the jth part in the whole data is processed when the first communication device adopts the ith split mode for processing. That is to say, the first communication device may process the jth part of data in the data by using a sub-processing model corresponding to the ith split mode.

It is to be noted that when the first configuration information configures two or more split modes (that is, N is greater than 1), M may be the same as N. That is to say, when the first configuration information configures two or more split modes, each split mode corresponds to one part of the data, and the split mode is in one-to-one correspondence with the part of the data. When the first configuration information configures one split mode (that is, N is 1), M is a value greater than N (that is, M is greater than 1), that is, even if the first configuration information configures one split mode, the data is split into a plurality of (M) parts, and the split mode configured by the first configuration information corresponds to the jth part. That is to say, the first communication device uses the split mode in one of the M parts of the data.

In practical applications, the processing resources of the first communication device to be occupied when various split modes are used for processing are different. The available processing resources of the first communication device cannot be completely matched the processing resources to be occupied by various split modes. In most cases, the available processing resources may be between the processing resources to be occupied by different split modes.

Figure 7:
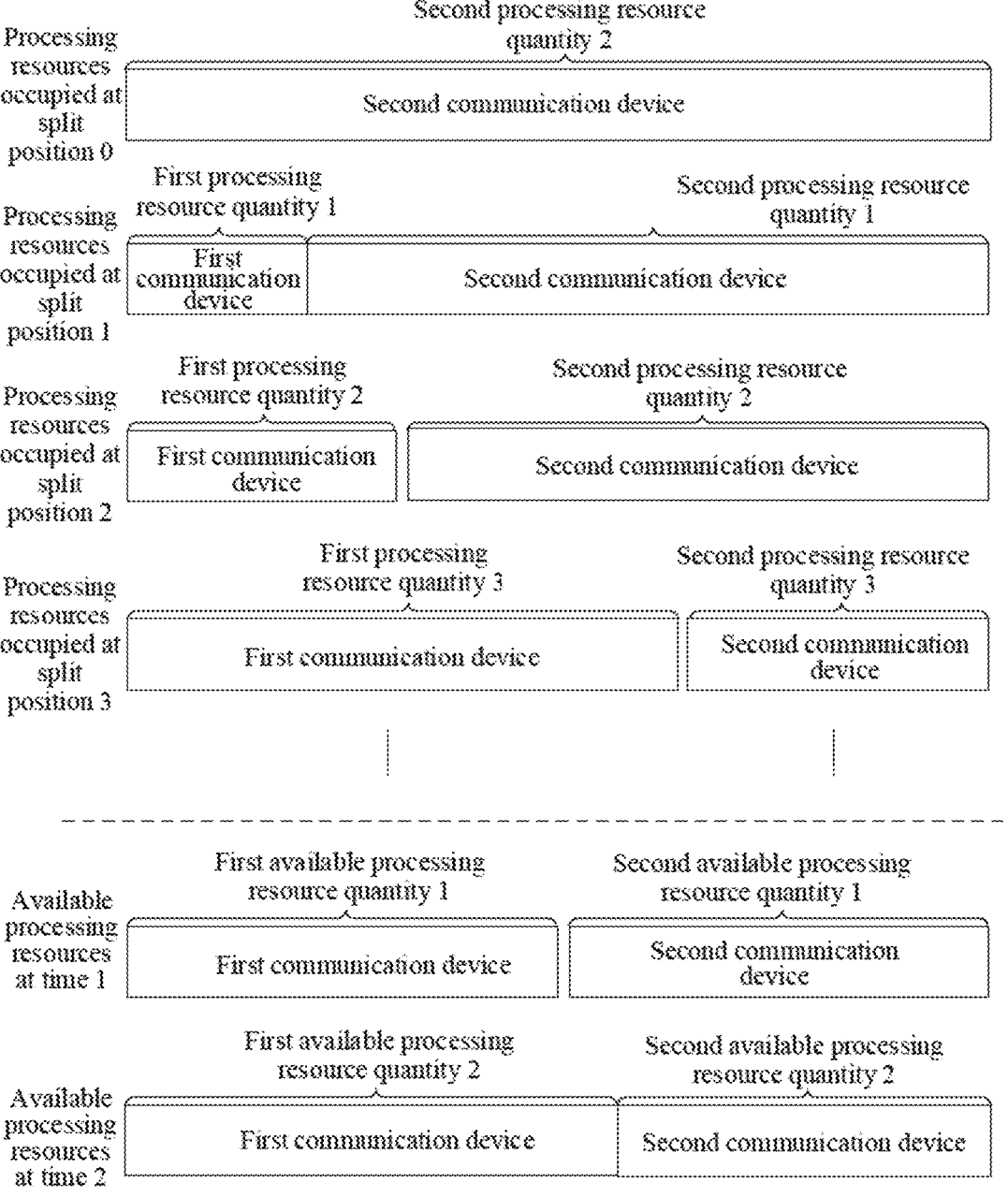
FIG. 7 illustrates a first schematic diagram of switching a split mode provided by an embodiment of the present disclosure.

For example, in FIG. 7, the size of the available processing resources of the first communication device at time 1 is a first available processing resource quantity 1. The first available processing resource quantity 1 is greater than a first processing resource quantity 2 occupied by a split position 2 (that is, a second split mode) and is less than a first processing resource quantity 3 occupied by a split position 3 (that is, a third split mode). Therefore, the available resources of the first communication device are wasted when data processing is performed using the split position 2, and the required processing resource quantity exceeds the first available processing resource quantity 1 when data processing is performed using the split position 3.

Based on this, in the embodiments provided by the present disclosure, the first communication device may configure N split modes for the data processing model through the first configuration information. Different parts of the data are processed by using different split modes, so that the average quantity of the processing resources occupied by the first communication device is matched with the available processing resources of the first communication device at current.

In a possible implementation mode, N split modes only include one split mode. The first configuration information may configure the jth part corresponding to the one split mode. That is to say, the first communication device processes the jth part of data in the split mode. In addition, the first communication device does not process the data of other parts (that is, the data of other parts are sent to the second communication device for processing) in any split mode, or processes the data of other parts in a specific split mode. Here, the specific split mode is a split mode agreed by the first communication device and the second communication device, and the specific split mode is any one of the split modes preset by the data processing model. In the embodiments provided by the present disclosure, the specific split mode may be a split mode configured in the factory or the split mode configured semi-statically by the second communication device.

In an example, for a video processing task, the configuration information only configures the first split mode and odd frames of data corresponding to the first split mode. Thus, the first communication device can process the odd frames of data by using the first split mode, and does not process the even frames of data in any split mode.

In another example, for a video processing task, the configuration information only configures a first split mode and odd frames of the data corresponding to the first split mode. The specific split mode agreed by the first communication device and the second communication device is the second split mode. In this way, the first communication device may use the above first split mode for processing the odd frames of data, and may use the second split mode for processing the even frames of data.

In another possible implementation mode, the N split modes include two or more split modes. The first communication device may use different split modes to process different parts of data according to the parts of data corresponding to the N split modes.

Exemplarily, for the video processing task, the N split modes include two split modes including a first split mode and a second split mode. The part of data corresponding to the first split mode is odd frames of data, and the part of data corresponding to the second split mode is even frames of data. Thus, the first communication device processes the odd frames of data by using the first split mode, and processes the even frames of data by using the second split mode according to the first configuration information. That is, the data is processed alternately by applying the first split mode and the second split mode.

In the embodiments provided by the present disclosure, a principle of the at least one split mode and the data information of the at least one split mode configured in the configuration information is that the processing resources occupied by the first communication device when using the at least one split mode is matched with the available processing resources of the first communication device.

Based on the foregoing embodiments, after S510 that the first configuration information is acquired, the method may further include the following operation S520.

At S520, the jth part of data is processed by using a sub-processing model corresponding to the ith split mode.

In a possible implementation mode, when N=1, only one split mode and the jth part corresponding to the one split mode are configured in the first configuration information. In this case, the first communication device may process the jth part of data by using the sub-processing model of the split mode. In addition, the first communication device does not process other parts of data other than the jth part in any split mode (that is, other parts of data are sent to the second communication device for processing). That is, the data is processed alternately by using the one split mode and a non-split mode configured in the first configuration information. In addition, in view of the abovementioned case, the first communication device may also process other parts of data other than the jth part by using a specific split mode. That is, the above split mode and the specific split mode are used alternately to process the data.

In another possible implementation mode, when N is greater than or equal to 2, the first configuration information configures two or more split modes and a part of data corresponding to each split mode, and the first communication device may process the data by using the sub-processing models corresponding to different split modes in different parts of data. It is to be understood that the sub-processing model corresponding to the ith split mode is used for processing on the jth part, and the sub-processing model corresponding to the (i+1)th split mode is used for processing on the (j+1)th part. That is, various parts of data are processed by alternately using the sub-processing models corresponding to the N split modes.

It is to be noted that the data is processed by traversing the plurality of split modes in a process of processing the data by alternately using the N split modes. Exemplarily, the first configuration information configures two split modes for the data processing model. The part of data corresponding to the first split mode is an odd frame part, and the part of data corresponding to the second split mode is an even frame part. The first communication device processes the first frame of data using the first split mode and processes the second frame of data using the second split mode. The first communication device continues traversing the two split modes. That is, the first communication device processes the third fame of data using the first split mode and processes the fourth frame of data using the second split mode. Thus, the two split modes are used alternately until the last frame of data to be processed.

Thus, different parts of data are processed by using different split modes, so that the processing resources of the first communication device occupied by the first communication device when performing data processing in the N split modes are matched with current available processing resources of the first communication device.

In conclusion, in the method for data processing provided by the embodiments of the present disclosure, the first communication device may process the jth part of data in an ith split mode. That is, different parts of data are processed using different split modes, so that the processing resources occupied when the data is processed using the N split modes are matched with the available processing resources of the first communication device, thereby improves the balance of resource occupation in a data processing process and a resource utilization rate in the data processing process.

Description is made below by taking image recognition as an example.

Figure 6:
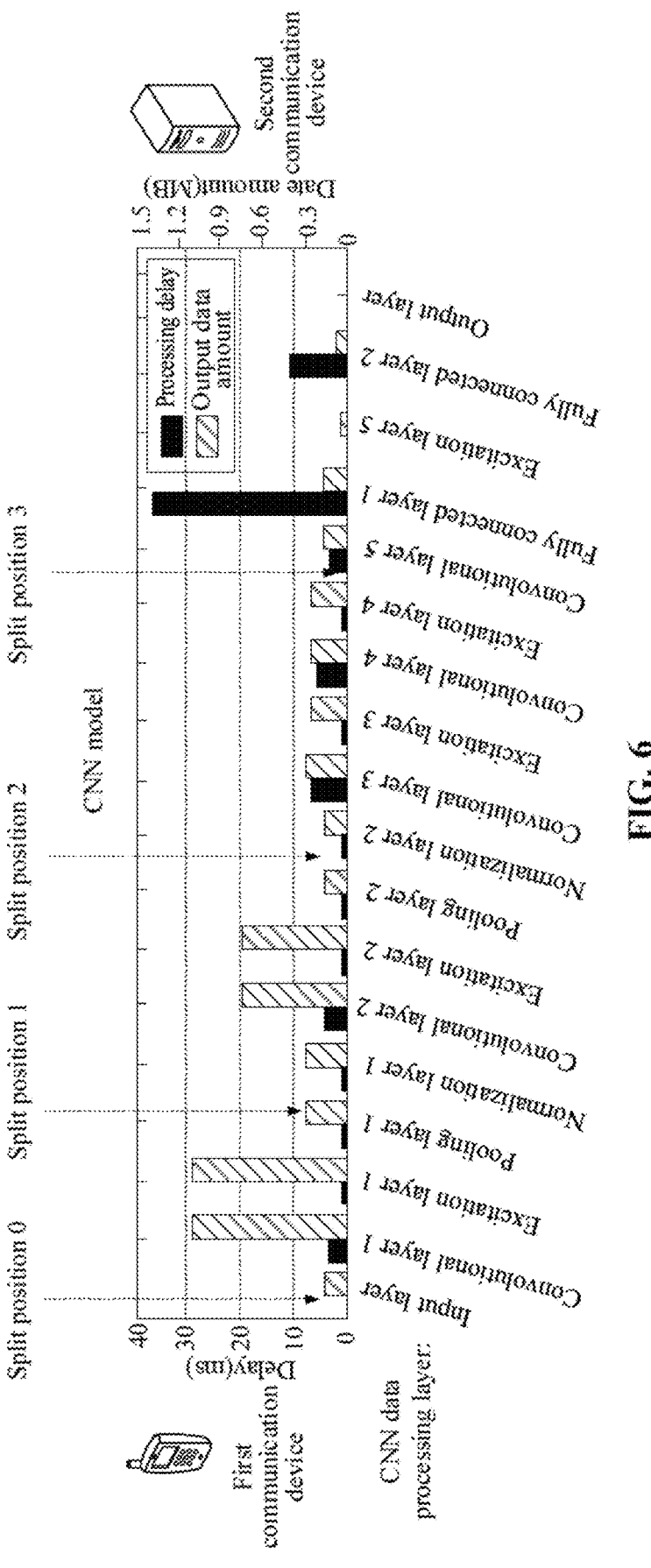
FIG. 6 illustrates a structural schematic diagram of a Convolutional Neural Network (CNN) model provided by the embodiments of the present disclosure.

In practical applications, in an image recognition task, a CNN model is usually used as a data processing model for image processing. Referring to the schematic structural diagram of the CNN model as shown in FIG. 6, the CNN model consists of different data processing layers. Specifically, the CNN model includes an input layer, a convolutional layer 1 to a convolutional layer 5, an activation layer 1 to an activation layer 5, a pooling layer 1 and a pooling layer 2, a normalization layer 1 and a normalization layer 2, a fully connected layer 1 and a fully connected layer 2, and an output layer. In addition, different data processing layers have different processing delays and output data amounts. For example, the processing delay corresponding to the second fully connected layer of the CNN model as shown in FIG. 6 is 10 ms, and the output data amount corresponding to the second fully connected layer of the CNN model is 0.1 MB.

The CNN model as shown in FIG. 6 has four optional split positions, including a split position 0 to a split position 3. Description is made by selecting the split position 2 as an example. The first communication device executes an output processing layer previous to the pooling layer 2 corresponding to the split position 2, and transmits output data obtained by the pooling layer 2 to a second communication device. In this way, the second communication device can execute the remaining data processing layer from the normalization layer 2 after the split position 2 according to the output data sent by the first communication device until the operation of the whole CNN model is completed, so as to obtain an image recognition result.

In addition, the sizes of processing resources occupied by different split positions are also different. As shown in FIG. 7, the split position 0 is a special split position. The first communication device directly sends collected original data (such as a photographed picture) to the second communication device without performing any operation, and the second communication device performs calculation of all layers of the CNN. Therefore, the split position 0 only occupies processing resources of the second communication device without occupying the processing resources of the first communication device. For the split position 1, the first communication device only performs calculation of a part of the data processing layer. The processing resource size of the first communication device to be occupied by the split position 1 is a first processing resource quantity 1, and the processing resource size of the second communication device to be occupied by the split position 1 is a second processing resource quantity 1. Similarly, when processing is performed through the split position 2, the processing resource size of the first communication device to be occupied is a first processing resource quantity 2, and the processing resource size of the second communication device to be occupied is a second processing resource quantity 2. In addition, when processing is performed through the split position 3, the processing resource size of the first communication device to be occupied is a first processing resource quantity 3, and the processing resource size of the second communication device to be occupied is a second processing resource quantity 3. The first processing resource quantity 2 occupied when data processing is performed on the basis of the split position 2 is larger than the first processing resource quantity 1 required by the split position 1. The first processing resource quantity 3 occupied by the split position 3 is greater than the first processing resource quantity 2 occupied by the split position 2.

In practical applications, at a certain time, the size of available processing resources of the first communication device may be among the processing resource quantities of the first communication device occupied by the abovementioned four split positions. As shown in FIG. 7, at time 1, the size of available processing resources of the first communication device is a first available processing resource quantity 1, and the size of available processing resources of the second communication device is a second available processing resource quantity 1. At time 2, the size of available processing resources of the first communication device is a first available processing resource quantity 2, and the size of available processing resources of the second communication device is a second available processing resource quantity 2. It can be seen from FIG. 7 that both the first available processing resource quantity 1 at time 1 and the first available processing resource quantity 2 at time 2 are higher than the first processing resource quantity 2 to be occupied by the split position 2, and are lower than the first processing resource quantity 3 to be occupied by the split position 3. That is, the available processing resources of the first communication device are insufficient to support the requirements of the split position 3, while the available processing resources of the first communication device cannot be fully utilized by using the split position 2, resulting in the waste of the available processing resources of the first communication device.

According to the method for data processing provided by the embodiments of the present disclosure, at least one split mode is applied to some parts of the data, that is, in the process of data processing, the first communication device switches between different split positions. For example, the first communication device processes a part of frames (for example, even frames) using the split position 2, and processes other part of frames (for example, odd frames) using the split position 3, so that the average quantity of the processing resources occupied by the first communication device is matched with the available processing resources of the first communication device. Thus, the processing resources of the first communication device can be fully utilized and the data processing efficiency can be improved.

In a possible implementation mode, the jth part is determined by at least one piece of the following information: a time domain period of the split mode, a time domain offset of the split mode, and a type of data information.

The time domain period is used for indicating a time domain period of the jth part of data, the time domain offset is used for indicating a time domain position of the jth part of data in the time domain period, and the type of the data information is used for indicating whether the jth part of data is a critical data unit or a non-critical data unit.

In practical applications, the time domain period can be understood as a time or space interval that the same thing occurs repeatedly. In the present disclosure, the time domain period refers to the time domain period of the jth part of data. Simply speaking, the time domain period is a time domain period of the data part processed by the first communication device when each of the N split modes are applied once.

Exemplarily, reference is made to exemplary configuration information as shown in Table 1. The configuration information includes two split positions (corresponds to two split positions): a split position 2 and a split position 3. The time domain period applying the domain mode is two frames, that is, data processed by the first communication device using both of the split position 2 and the split position 3 is two frames of data.

In addition, in the embodiments provided by the present disclosure, different split modes correspond to different time domain offsets. The time domain offset of the split mode refers to a time domain position of the jth part of data in the time domain period when the jth part of data is processed by applying the ith split mode.

Exemplarily, reference is made to exemplary configuration information as shown in Table 1. The division positions include a division position 2 and a division position 3. A time domain offset of the division position 2 is 1, and a time domain offset of the division position 3 is 0. That is to say, the first communication device may process data by using the split position 2 at the first image frame of one time domain period, and process data by using the split position 3 at the 0th image frame of one time domain period.

TABLE 1

|  | Time domain period | Time domain offset |
| --- | --- | --- |
| Split position 2 | two frames | 1 |
| Split position 3 | Two frames | 0 |

In another implementation mode, the part of data corresponding to each split mode may also be determined by the type of data information. The type of data information is used for indicating whether the jth part is a critical data unit or a non-critical data unit, that is to say, the type of data information is used for indicating whether each part of the data is a critical data unit or a non-critical data unit.

The critical data unit or the non-critical data unit corresponds to different split modes. Generally, the critical data unit is very important to a user and has privacy sensitivity, so it is not suitable to be directly transmitted through a wireless network or not suitable to be processed through other communication devices. Therefore, all critical data units may be processed in the first communication device and the non-critical data units may be sent to the second communication device for processing.

Thus, the critical data unit may use a preset critical split mode, and the non-critical data unit may use a preset non-critical split mode. Thus, the critical data unit in the data may be processed by using a sub-processing model corresponding to a critical split mode, and the non-critical data unit in the data may be processed by using a sub-processing model corresponding to a non-critical split mode.

Based on the abovementioned embodiments, in a possible implementation mode, the operation S510 that the first configuration information is acquired may be implemented through the following operations.

At S5101, the first communication device receives at least one piece of configuration information.

At S5102, the first communication device determines the first configuration information from at least one piece of configuration information.

In the implementation mode provided by the present disclosure, the first configuration information may be configured to the first communication device by the second communication device. Specifically, the second communication device may send at least one piece of configuration information to the first communication device, and determine the first configuration information from the at least one piece of configuration information.

In another possible implementation mode, the first communication device may also determine the first configuration information from at least one piece of configuration information according to the indication of the second communication device.

Based on the abovementioned embodiments, after S5101 that at least one piece of configuration information is received, the method for data processing provided by the embodiments of the present disclosure further includes the following operations.

S5101*a*, scheduling signaling is received.

Here, the scheduling signaling is used for indicating second configuration information of a plurality of pieces of configuration information.

S5101*b*, the second configuration information is determined from at least one piece of configuration information on the basis of the scheduling information.

Here, the second configuration information, which is similar to the first configuration information, are used for configuring N split modes and the jth part corresponding to the ith split mode among the N split modes.

In the embodiments provided by the present disclosure, the second configuration information may be the same as the first configuration information, or may be different from the first configuration information, which is not limited in the embodiments of the present disclosure.

In the embodiments provided by the present disclosure, the second communication device may determine second configuration information which is more suitable for the current wireless channel state and the available processing resource size for the first communication device according to the available processing resources of the first communication device or a state of a wireless channel between the first communication device and the second communication device.

Here, the second communication device may carry the second configuration information in the scheduling information and send the scheduling information to the first communication device. After receiving the scheduling information, the first communication device selects the second configuration information from the plurality of pieces of configuration information and performs data processing on the basis of the second configuration information.

It is to be noted that the first communication device can determine the amount of data transmitted on the wireless channel according to the quality of the wireless channel state. When the state of the wireless channel is good, configuration information with a large amount of data transmitted on the wireless channel may be adopted. When the state of the wireless channel is poor, the configuration information with a small amount of data transmitted on the wireless channel may be adopted.

Exemplarily, referring to the schematic structural diagram of the CNN model as shown in FIG. 6, the output data amount of the split position 1 is the sum of output data amounts of the convolutional layer 1, the activation layer 1 and the pooling layer 1, and the output data amount of the split position 3 is the sum of output data amounts of all the data processing layers on the left side of the activation layer 4. Therefore, the output data amount of the split position 1 is less than that of the split position 3. If the first communication device performs data processing by using the split position 3, when the second communication device detects that the current state of the wireless channel is poor, the current split mode may be reconfigured, and the split position 3 in the current configuration information is modified as the split position 2. Thus, the amount of data transmitted in the wireless channel is reduced.

In the embodiments provided by the present disclosure, the specific split mode may be a split mode configured in the factory or the split mode configured semi-statically by the second communication device.

Thus, the data transmission amount of the configuration information can be reduced and the transmission efficiency of the configuration information can be improved by only configuring information related to one split mode.

In a possible implementation mode, the first communication device may also determine the first configuration information locally on the basis of available processing resource information. A determination mode of the first communication is the same as the mode of determining the first configuration information by the second communication device on the basis of the available processing resource information, which is described in detail below.

In a possible implementation mode, before S510 that the first configuration information is acquired, the method for data processing provided by the present disclosure further includes the following operations.

At S501, available processing resource information is sent to a second communication device.

The available processing resource information includes at least one of available computing resource quantity, available storage resource quantity and available electric quantity of the first communication device.

In the embodiments provided by the present disclosure, the first communication device may send the available processing resource information of the first communication device to the second communication device. Thus, after receiving the available processing resource information, the second communication device matches a split mode suitable for current available processing resources of the first communication device and data information corresponding to each split mode for the first communication device.

In a possible implementation mode, after S501 that the available processing resource information is sent to the second communication device, the method further includes the following operations.

At S502, updated available processing resource information is acquired if the available processing resource information changes.

At S503, the updated available processing resource information is sent to the second communication device.

In the embodiments provided by the present disclosure, the first communication device switches from one type of configuration information to another type of configuration information when the available processing resources of the first communication device change. On this basis, the first communication device sends the updated available processing resource information to the second communication device. Thus, after receiving the updated available processing resource information, the second communication device matches a split mode suitable for current available processing resources of the first communication device and data information corresponding to each split mode for the first communication device.

In a possible implementation mode, the first communication device is a terminal device, and the second communication device is a network device.

When the second communication device is a network device, the first communication device may acquire the first configuration information from the following information: control channel information, Media Access Control Control Element (MAC CE) information, high-layer configuration signaling, and application layer control information.

The control channel information includes Downlink Control Information (DCI). In the embodiments of the present disclosure, the at least one piece of configuration information may be sent through a special DCI format of the DCI, or may be generated by a special Radio Network Temporary Identity (RNTI). The high-layer configuration signaling may be Radio Resource Control (RRC) signaling.

According to the method for data processing provided by the embodiments of the present disclosure, the first communication device may process the jth part of the data in an ith split mode. That is, different parts of data are processed in different split modes, so that processing resources occupied when the data is processed in the N split modes are matched with available processing resources of the first communication device, which improves balance of resource occupation in a data processing process and a resource utilization rate in the data processing process.

Referring to the schematic flowchart of a method for data processing as shown in FIG. 8, the method for data processing includes operations S810 and S820.

At S810, at least one piece of configuration information is determined.

Each piece of the at least one piece of the first configuration information is used for configuring N split modes for processing data to be processed, N parts divided from the data, and a jth part corresponding to an ith split mode. N is an integer greater than or equal to 1, i is greater than or equal to 1 and less than or equal to N. and j is greater than or equal to 1 and less than or equal to N.

The N split modes may be a split mode for splitting a data processing model into at least two sub-processing models by presetting a split position.

At S820, at least one piece of configuration information is sent to the first communication device. The at least one piece of configuration information includes the first configuration information.

In a possible implementation model, in a case where the second communication device is a network device, the at least one piece of configuration information is carried in at least one piece of the following information: control channel information. MAC CE information, high-layer configuration signaling, and application layer control information, and is sent to the first communication device.

The control channel information includes DCI. In the embodiments of the present disclosure, the at least one piece of configuration information may be sent through a special DCI format of the DCI, or may be generated by an RNTI. The high-layer configuration signaling may be RRC signaling.

In a possible implementation mode, the jth part is determined by at least one piece of the following information: a time domain period of the split mode, a time domain offset of the split mode, and a type of data information.

The time domain period is used for indicating the time domain period of the jth part of data. The time domain offset is used for indicating the time domain position of the jth part in time domain period. The type of the data information is used for indicating whether the jth part is a critical data unit or a non-critical data unit.

Here, explanations of the time domain period of the split mode, the time domain offset of the split mode, and the type of the data information are described in detail in the above-mentioned embodiments, which will not be elaborated here in the embodiments of the present disclosure.

In a feasible implementation mode, S810 that at least one piece of configuration information is determined may be implemented by operations S8101 and S8102.

At S8101, available processing resource information sent by the first communication device is received.

At S8102, at least one piece of configuration information is determined on the basis of the available processing resource information.

In the embodiments provided by the present disclosure, after receiving the available processing resource information, the second communication device may match N split modes suitable to the current available processing resources of the first communication device and the jth part corresponding to each split mode in the N split modes for the first communication device.

Here, processing resources of the first communication device occupied by the N split modes matched by the second communication device are matched with the available processing resources of the first communication device.

It is to be noted that the processing resources of the first communication device occupied by the N split modes being matched with the available processing resources may be that the processing resources of the first communication device occupied by the N split modes are equal to the available processing resources, or may be that an absolute value of a difference between the processing resources of the first communication device occupied by the N split modes and the available processing resources is less than a preset threshold value, which is not limited in the embodiments of the present disclosure.

According to the method for data processing provided by the embodiments of the present disclosure, the second communication device may determine at least one piece of configuration information for the first communication device according to the available processing resources of the first communication device. N split modes and data information of at least one split mode in a data processing process are configured through the configuration information, so that the N split modes are only applied in some parts of the data respectively, and not the same split mode is used on the whole data fixedly. In this way, the N split modes are applied to some parts of the data to be processed, the processing resources occupied when the data to be processed is processed in the N split modes are matched with the available processing resources of the first communication device, which improves the balance of resource occupation in a data processing process and the resource utilization rate in the data processing process.

On this basis, in a possible implementation mode, S8102 that at least one piece of configuration information is determined on the basis of the available processing resource information may be implemented by the following operations.

At S8102a, the second communication device determines initial parameters corresponding to preset M split modes, M is an integer greater than or equal to 2, and each initial parameter is a natural number.

At S8102b, the second communication device continuously adjusts the initial parameters on the basis of the preset processing resource quantities respectively occupied by the preset M split modes, so as to obtain an average processing resource quantity occupied by the preset M split modes.

At S8102c, the second communication device determines a non-zero target parameter when the average processing resource quantity is matched with the available processing resources.

At S8102d, the second communication device determines N split modes corresponding to the target parameter from the preset M split modes.

At S8102e, the N split modes and the target parameters corresponding to the N split modes are determined as one piece of configuration information, so as to obtain at least one piece of configuration information.

In the embodiments provided by the present disclosure, there may be a plurality of preset split modes of the data processing model. Here, the number of the preset split modes is replaced with M, and M is an integer greater than or equal to 2.

In some embodiments of the present disclosure, the second communication device acquires all preset split modes, and determines an initial parameter for each preset split mode. Each initial parameter is a natural number. The initial parameter here may represent the initial time domain offset of each split mode.

In the embodiments of the present disclosure, the average processing resource quantity occupied by the M split modes is calculated by continuously adjusting the value of the initial value.

Specifically, the second communication device sums the products of, for each of the M split modes, the initial parameter corresponding to the split mode and the processing resource occupied by the split mode, and solves a quotient between a result of the sum and the sum of values of the current M initial parameters. A result of the quotient is the average processing resource quantity occupied by the M split modes.

Further, every time the average processing resource quantity occupied by the M split modes is calculated, whether the calculated average processing resource quantity is matched with the available processing resources of the first communication device is determined. If not, the value of the initial parameter is continued to be adjusted, and if so, a non-zero value in the current initial parameter is determined, and the non-zero value parameter is determined as the target parameter. Here, the target parameter may indicate the time domain offset corresponding to each split mode.

Here, the split mode corresponding to the non-zero parameter is the split mode to be applied by the data processing model. The size of the non-zero value target parameter may indicate the time domain offset of the applied split mode.

In a possible implementation mode, after obtaining the target parameter, the second communication device determines two split modes corresponding to the target parameter from the present M split modes. If the two split modes include a mode of not splitting the data processing model (that is, the split mode corresponding to the split position 0 as shown in FIG. 6), or the two split modes include a specific split mode, then the first communication device may remove the mode of not splitting the data processing model or the specific split mode. The configuration information is generated only according to the other split mode and the target parameter corresponding to the split mode. Thus, the generated configuration information includes only one split mode, that is, N is 1.

In another possible implementation mode, after obtaining the target parameter, the second communication device determines more than two split modes corresponding to the target parameter from the preset M split modes. The at least two split modes and the target parameter are determined as one piece of configuration information. Thus, the generated configuration information includes a plurality of split modes, that is, N is greater than 1.

When the second communication device needs to configure a plurality of pieces of configuration information for the first communication device, the abovementioned operations are repeated to obtain a plurality of pieces of configuration information, which will not be elaborated herein.

Exemplarily, when there are three preset split modes, the initial parameters of each split mode are set as a, b, and c. The processing resource quantity occupied by the first split mode is X, the amount of processing resource quantity occupied by the second split mode is Y, and the processing resource quantity occupied by the third split mode is Z. The second communication device may adjust the values of the initial parameters a, b, and c. The average processing resource quantity occupied by the three split modes under different values of the initial parameters a, b and c according to formula (1):

$$\frac{aX + bY + cZ}{a + b + c} \quad (1)$$

Further, after the average processing resource quantity occupied by the three split modes is calculated each time, whether the calculated average processing resource quantity is matched with the available processing resource quantity of the first communication device is determined. If not, the value of the initial parameter is continued to be adjusted: and if so, a non-zero value in the current initial parameter is determined, and the non-zero value parameter is determined as a target parameter.

Here, whether the calculated average processing resource quantity is matched with the available processing resources of the first communication device may be determined by determining whether a difference between the average processing resource quantity and the available processing resource quantity of the first communication device is less than a threshold value.

The abovementioned mode for determining the configuration information is described below by taking an image recognition task as an example.

Referring to FIG. 7, the first available processing resource quantity 1 is an average value between the first processing resource quantity 2 and the first processing resource quantity 3. In this case, the matching with the first available processing resource quantity 1 may be realized by alternately using the split position 2 and the split position 3.

Figure 9:
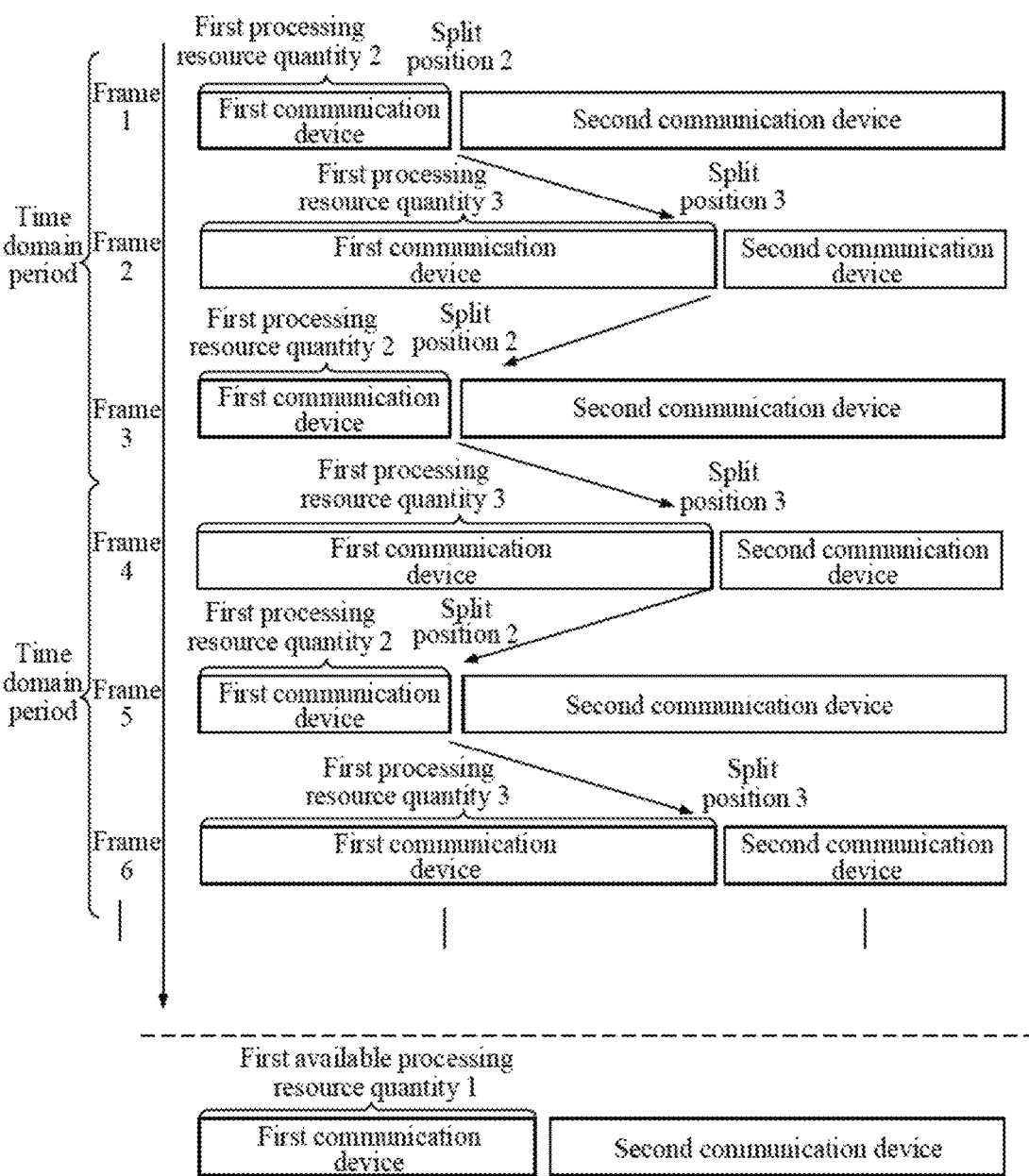
FIG. 9 illustrates a second schematic diagram of switching a split mode provided by an embodiment of the present disclosure.

Referring to FIG. 9, the split position 2 may be used at an odd frame, and the split position 3 may be used at an even frame. In this way, the occupied processing resource quantity of the first communication device for an odd frame is the first processing resource quantity 2, and the occupied processing resource quantity of the first communication device for an even frame is the first processing resource quantity 3. The average of the first processing resource quantity 2 and the first processing resource quantity 3 is equal to the first available processing resource quantity 1. By alternately switching between the split position 2 and the split position 3, the processing resources occupied by the first communication device in the data processing process based on the above mode is matched with the available processing resources of the first communication device. Thus, the available processing resources of the first communication device can be fully utilized and the data processing efficiency can be improved.

Further, an example of the configuration information about alternately using the split position 2 and the split position 3 is as shown in Table 1. A time domain period of the split position (that is, the split mode) may be configured as two frames, a time domain offset of the split position 2 is 1, and a time domain offset of the split position 3 is 0. That is, the frame having the time domain offset of 1 adopts the split position 2, and the frame with the time domain offset of 3 adopts the split position 3. In this case, the average quantity of the processing resources occupied by the first communication device is equal to the first available processing resource quantity 1.

In another feasible example, if the available processing resource quantity of the first communication device is the first available processing resource quantity 2 in FIG. 7 and is greater than the first available processing resource quantity 1, the processing resources occupied by using an average alternating mode in the previous example exceeds the available processing resource quantity of the first communication device. Therefore, the first communication device cannot complete the image recognition task. In this case, the matching of the processing resource quantity with the first available processing resource quantity 2 may be realized by using uneven alternating between the split position 2 and the split position 3.

Figure 10:
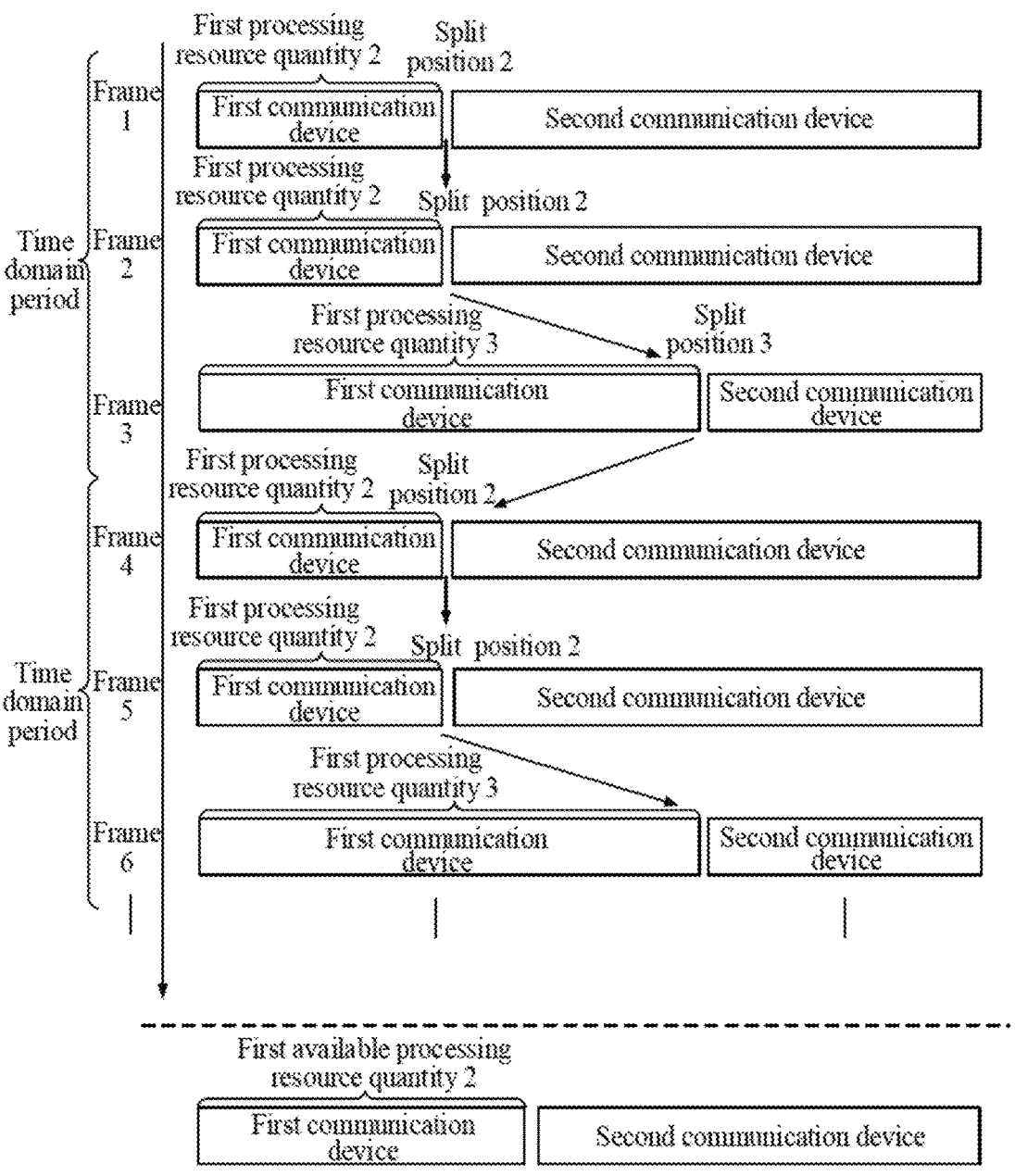
FIG. 10 illustrates a third schematic diagram of switching a split mode provided by an embodiment of the present disclosure.

As shown in FIG. 10, the split position 2 may be adopted for two frames in every three frames and the split position 3 may be adopted for one frame in every three frames. Thus, the processing resource quantity of the first communication device occupied by the frames with the time domain offsets of 1 and 2 is the first processing resource quantity 2, the processing resource quantity of the first communication device occupied by the frame with the time domain offset of 3 is the first processing resource quantity 3, and a final average value of the first processing resource quantity 2 and the first processing resource quantity 3 is equal to the first available processing resource quantity 2. Thus, the first communication device performs resource processing by alternately using the split position 2 and the split position 3, so that the processing resources occupied by the first communication device in a data processing process based on the abovementioned mode is matched with the available processing resources of the first communication device. Thus, the computing capacity of the first communication device can be fully utilized and the data processing efficiency can be improved.

The configuration information about alternately using the split position 2 and the split position 3 is as shown in Table 2. The time domain period of the split position (that is, the split mode) may be configured as three frames, the time domain offset of the split position 2 is 1 or 2, and the time domain offset of the split position 3 is 3. That is, the frame with the time domain offset of 1 or 2 adopts the split position 2, and the frame with the time domain offset of 3 adopts the split position 3. Thus, the average quantity of the processing resources occupied by the first communication device is equal to the first available processing resource quantity 2.

TABLE 2

|  | Time domain period | Time domain offset |
|---|---|---|
| Division position 2 | three frames | 1, 2 |
| Division position 3 | three frames | 3 |

In another feasible implementation mode, the configuration information may also be determined through the type of data information.

Specifically, S810 that at least one piece of configuration information is determined may be implemented by operations S8101' and S8102'.

At S8101', the type of the data information is acquired.

At S8102', whether the jth part of M parts of data is a critical data unit or a non-critical data unit is determined on the basis of the type of the data information.

At S8013', it is determined that the jth part corresponds to a critical split mode if the jth part is a critical data unit.

At S8103', it is determined that the jth part corresponds to a non-critical split mode if the jth part is a non-critical data unit.

At S8103', one piece of configuration information is determined on the basis of the split mode corresponding to the jth part in the M parts of data.

In some embodiments of the present disclosure, the second communication device may determine whether each part of the data is a critical data unit or a non-critical data unit according to the type of the data information.

Generally, the critical data unit is very important to a user and has privacy sensitivity, so it is not suitable to be directly transmitted through a wireless network. All critical data units may be processed in the first communication device and the non-critical data units may be sent to the second communication device for processing.

Thus, the critical data unit may use the preset critical split mode, and the non-critical data unit may use a preset non-critical split mode. The second communication device may use the critical split mode in the critical data unit of the data and uses the non-critical split mode in the non-critical data unit of the data.

In the embodiments provided by the present disclosure, the second communication device can determine whether each part of data belongs to non-critical data unit or critical data unit. If the jth part is a critical data unit, it is determined that the jth part is processed by using a preset critical split mode. If the jth part is a non-critical data unit, then it is determined that the jth part is processed by using a preset non-critical split mode.

In the embodiments provided by the present disclosure, in the manner that at least one piece of configuration information is determined by the type of data information, the part of the data may include two parts, that is, a value of M is 2. The first part includes a critical data unit and the second part includes a non-critical data unit. In addition, in this case, there are also two split modes, that is, a value of N is also 2. The first split mode is the abovementioned critical split mode, and the second split mode is a non-critical split mode.

The above mode for determining the configuration information is described below by taking an image recognition task as an example.

In practical applications, an image may be divided into a critical frame (that is, a picture including original information of a complete image) and a non-critical frame (that is, the frame only includes incremental information or prediction information of the image). The critical frame includes the original image information, and thus has privacy sensitivity and is not suitable to be transmitted in a network. The non-critical frame does not include the original information of the image, and even if it is transmitted in a wireless channel, privacy information will leak. Therefore, a split mode (the split position 1 as shown in FIG. 6) in which calculation is partially performed on a terminal side may be adopted for the critical frame, and a split mode (the split position 0 as shown in FIG. 6) in which the calculation is wholly performed on a second communication network may be adopted for the non-critical frames.

Figure 11:
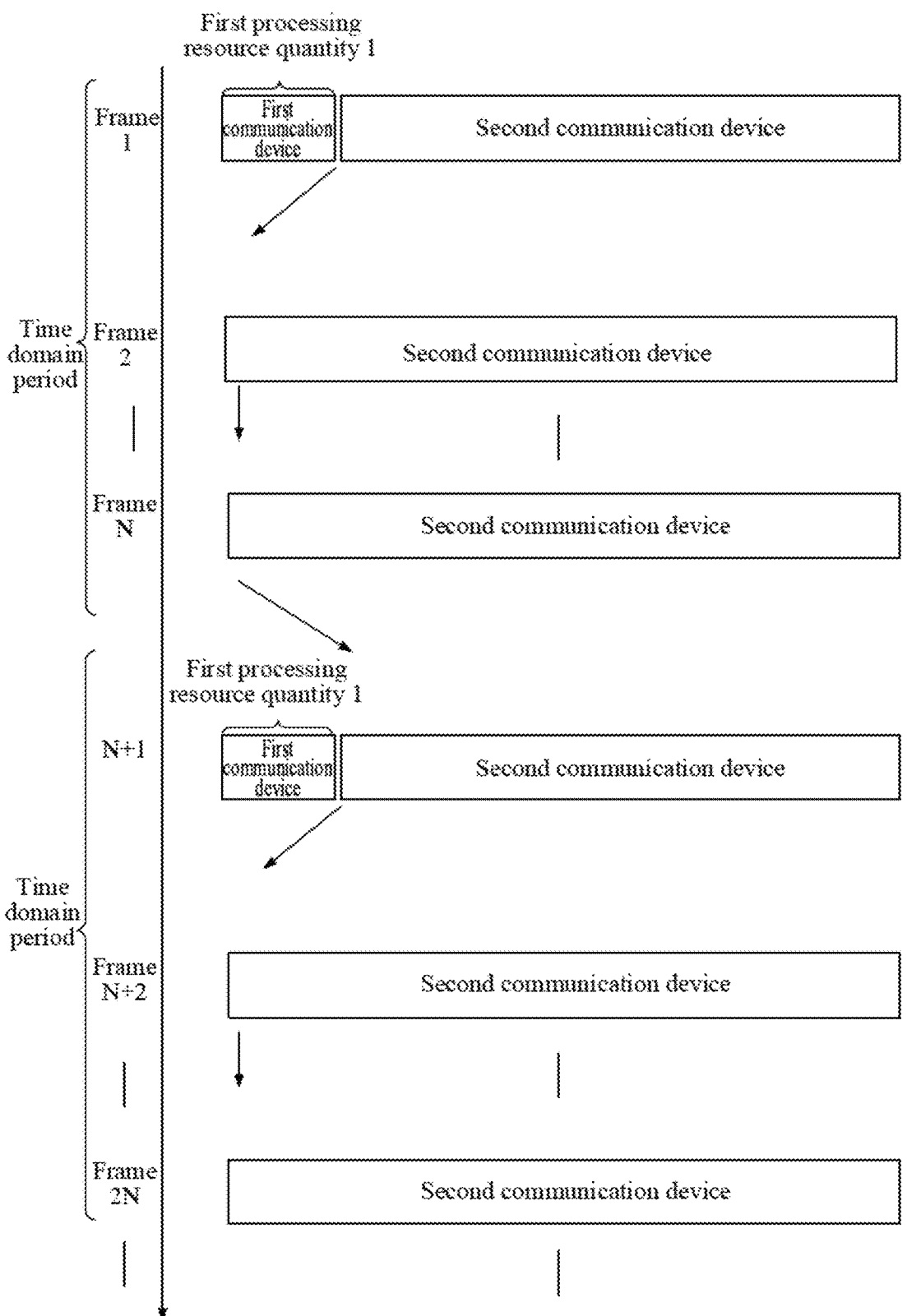
FIG. 11 illustrates a fourth schematic diagram of switching a split mode provided by an embodiment of the present disclosure.

Specifically, as shown in FIG. 11, assuming that there is one critical frame in every N frames and the resting frames are non-critical frames, the critical frames may be processed in the critical split mode to avoid transmitting the critical frames carrying the original image data in the wireless channel, while the other non-critical frames may be processed in a non-critical split mode, that is, all of the non-critical frames are processed by the second communication device, so as to save the computing resources of the first communication device. Thus, the privacy of the data of the first communication device can be protected while the processing capacity of the second communication device can also be fully utilized, thereby saving precious processing resources of the first communication device.

The abovementioned configuration information about alternately using the critical split mode and the non-critical split mode is as shown in Table 3. A time domain period of the split mode may be configured to be N frames, and a time domain offset of the frame in the critical split mode is 0, and the time domain offset of the frame in the non-critical split mode may be non-zero.

TABLE 3

|  | Time domain period | Time domain offset |
|---|---|---|
| Critical split mode | N frame | ≠1 |
| Non-critical split mode | N frame | =1 |

In a possible implementation mode, the first configuration information may include initial configuration information. The first initial configuration information includes a first split mode and the length of a split data unit corresponding to the first split mode.

In the embodiments provided by the present disclosure, the second communication device may send the initial configuration information to the first communication device. The initial configuration information here may only include the information related to one split mode, that is, only include the first split mode and the length of a split data unit corresponding to the first split mode.

In another possible implementation mode, after S830 that at least one piece of configuration information is sent to the first communication device, the method may further include the following operations.

At S840, scheduling information is sent to the first communication device. The scheduling information is used for indicating second configuration information in a plurality of pieces of configuration information.

In the embodiments provided by the present disclosure, the second communication device needs to instruct the first communication device to switch from one type of configuration information to another type of configuration information when the available processing resources of the first communication device change.

Specifically, the second communication device may send the scheduling information to the first communication device, which instructs the first communication device selects second configuration information from the plurality of pieces of configuration information for performing data processing.

In the embodiments provided by the present disclosure, the second communication device may determine the second configuration information on the basis of a state of a wireless channel with the first communication device and the updated available processing resource information sent by the first communication device, and generate the scheduling information on the basis of the second configuration information.

Specifically, the second communication device may determine target configuration information which is more suitable for the current wireless channel state and the available processing resource size for the first communication device according to the available processing resources of the first communication device or the state of the wireless channel between the first communication device and the second communication device.

It is to be noted that the first communication device can determine the amount of data transmitted on the wireless channel according to the quality of the state of the wireless channel. When the state of the wireless channel is good, the configuration information with a large amount of data transmitted on the wireless channel may be adopted. When the state of the wireless channel is poor, the configuration information with a small amount of data transmitted on the wireless channel may be adopted.

Further, after receiving the scheduling signaling, the second communication device reconfigures the at least two split modes and the length of the split data unit on the basis of the second configuration information indicated by the scheduling signaling. Data processing is performed on the basis of the second configuration information.

According to the method for data processing provided by the embodiments of the present disclosure, the second communication device may determine at least one piece of configuration information for the first communication device according to the available processing resources of the first communication device, and configure N split modes and data information of the N split modes in a data processing process through the configuration information. In this way, the N split modes are only applied in some parts of the data, and not the same split mode is used on all of the data fixedly. Therefore, the N split modes are applied in some data parts of the data to be processed, so that the processing resources occupied when the data to be processed is processed in the at least one split mode are matched with the available processing resources of the first communication device, which improves the balance of resource occupation in a data processing process and the resource utilization rate in the data processing process.

Figure 12:
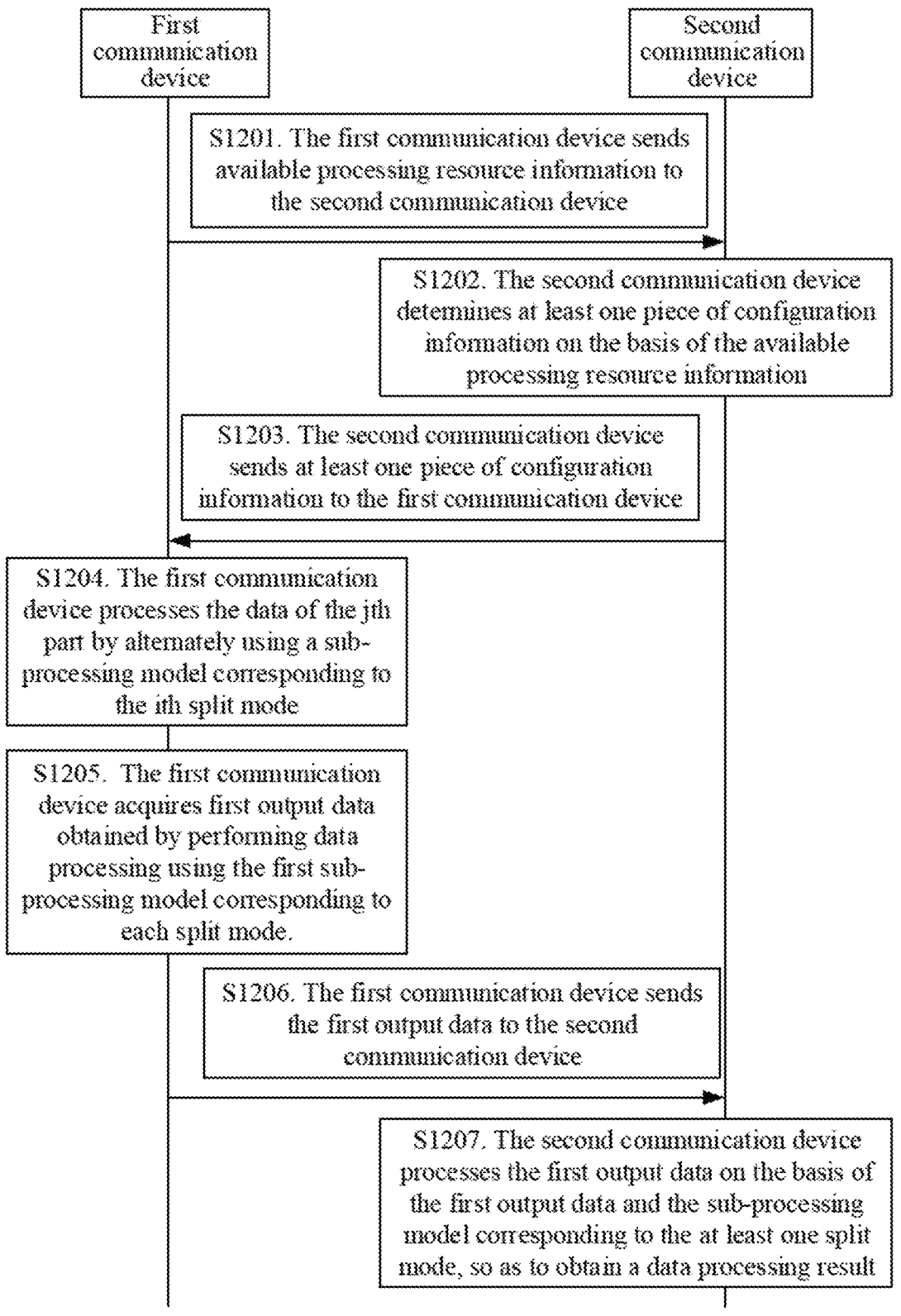
FIG. 12 illustrates a third schematic flowchart of a method for data processing provided by an embodiment of the present disclosure.

On the basis of the abovementioned embodiments, the embodiments of the present disclosure provide a method for image processing. As shown in FIG. 12, the method for data processing provided by the embodiments of the present disclosure includes the following operations.

At S1201, the first communication device sends available processing resource information to the second communication device.

In the embodiments provided by the present disclosure, the available processing resource information includes at least one of available computing resource quantity, available storage resource quantity and available electric quantity of the first communication device.

At S1202, the second communication device determines at least one piece of configuration information on the basis of the available processing resource information.

At S1203, the second communication device sends at least one piece of configuration information to the first communication device.

In the embodiments provided by the present disclosure, the at least one piece of configuration information includes first configuration information.

The first configuration information is used for configuring N split modes and a jth part corresponding to an ith split mode among the N split modes, N is an integer greater than or equal to 1, i is greater than or equal to 1 and less than or equal to N, j is greater than or equal to 1 and less than or equal to M, M is an integer greater than 1, and the N split modes are a split mode for dividing a data processing model into at least two sub-processing models by presetting a split position.

At S1204, the first communication device processes the jth part of data by using a sub-processing model corresponding to the ith split mode.

Here, the split mode may split the data processing model into a first part sub-processing model and a second part sub-processing model. The first part sub-processing model is operated by the first communication device. The second first part sub-processing model is operated by the second communication device.

The first part sub-processing model and the second part sub-processing model obtained by different split modes are different.

In the embodiments provided by the present disclosure, the first communication device processes the data to be processed according to the first part sub-processing model corresponding to each of the N split modes.

It is to be understood that the first communication device processes the data by alternately using the first part sub-processing models corresponding to the N split modes.

At S1205, the first communication device acquires first output data obtained by performing data processing using the first sub-processing model corresponding to each split mode.

Here, the first communication device processes the data to be processed according to the first part sub-processing model corresponding to at least one N split mode to obtain an intermediate result, that is, first output data.

At S1206, the first communication device sends the first output data to the second communication device.

Here, the first communication device may send the first output data every time outputted by the data processing model to the second communication device through a wireless link, and the first communication device may also send a plurality of pieces of output data to the second communication device after obtaining the plurality of pieces of the first output data. There are no limits made thereto in the embodiments of the present disclosure.

At S1207, the second communication device processes the first output data on the basis of the first output data and the sub-processing model corresponding to the ith split mode, so as to obtain a data processing result.

In the embodiments provided by the present disclosure, the second communication device processes the data to be processed according to the second part sub-processing model corresponding to at least one split mode after receiving the first output data, to obtain a final data processing result.

It is to be understood that the second communication device processes the data by alternately using the second part sub-processing models corresponding to the N split modes on the basis of the first output data.

In conclusion, in the method for data processing provided by the embodiments of the present disclosure, the first communication device may apply N split modes only in some parts of the data to be processed, and not the same split mode is used on all the data fixedly. In this way, the N split modes are applied to some parts of the data to be processed, the processing resources occupied when the data to be processed is processed in the N split modes are matched with the available processing resources of the first communication device, which improves the balance of resource occupation in a data processing process and the resource utilization rate in the data processing process.

Figure 13:
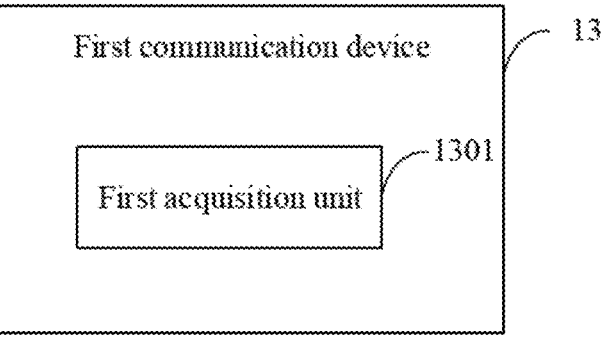
FIG. 13 illustrates a first schematic structural diagram of a communication device provided by an embodiment of the present disclosure.

On the basis of the same inventive concept of the first embodiment, the embodiments of the present disclosure provides a communication device 13, corresponding to a method for data processing applied to a first communication device. FIG. 13 illustrates a first schematic diagram of a composition structure of the communication device provided by the embodiments of the present disclosure. The communication device 13 may include a first acquisition unit 1301.

The first acquisition unit 1301 is configured to acquire first configuration information. The first configuration information is used for configuring N split modes and a jth part corresponding to an ith split mode among the N split modes. N is an integer greater than or equal to 1, i is greater than or equal to 1 and less than or equal to N, j is greater than or equal to 1 and less than or equal to M, and M is an integer greater than 1.

The N split modes may be a split mode for splitting a data processing model into at least two sub-processing models by presetting a split position.

In some embodiments of the present disclosure, the first communication device further includes a first processing unit.

The first processing unit is configured to process the jth part of data of by using a sub-processing model corresponding to the ith split mode.

In some embodiments of the present disclosure, the jth part is determined by at least one piece of the following information: a time domain period of the split mode, a time domain offset of the split mode, and a type of data information.

The time domain period is used for indicating the time domain period of the jth part of data the time domain offset is used for indicating a time domain position of the jth part in the time domain period, and the type of the data information is used for indicating whether the jth part is a critical data unit or a non-critical data unit.

In some embodiments of the present disclosure, the communication device includes a first receiving unit and a first determination unit.

The first receiving unit is configured to receive at least one piece of configuration information.

The first determination unit is configured to determine the first configuration information from the at least one piece of configuration information.

In some embodiments of the present disclosure, the first receiving unit is configured to receive the sent scheduling signaling.

The first processing unit is configured to determine second configuration information from at least one piece of configuration information according to the scheduling information.

In some embodiments of the present disclosure, the first sending unit 1303 is configured to send available processing resource information to the second communication device.

In some embodiments of the present disclosure, the available processing resource information may include at least one of available computing resource quantity, available storage resource quantity and available electric quantity of the first communication device.

In some embodiments of the present disclosure, the communication device further includes a sending unit.

The first acquisition unit 1301 is configured to acquire updated available processing resource information when the available processing resource information changes.

The first sending unit is configured to send the updated available processing resource information to the second communication device.

It is to be understood that the communication device provided by the embodiments of the present disclosure can only apply N split modes to some parts of the data, and not the same split mode is used on all the data fixedly. In this way, the N split modes are applied to some parts of the data to be processed, the processing resources occupied when the data to be processed is processed in the N split modes are matched with the available processing resources of the first communication device, which improves the balance of resource occupation in a data processing process and the resource utilization rate in the data processing process.

Figure 14:
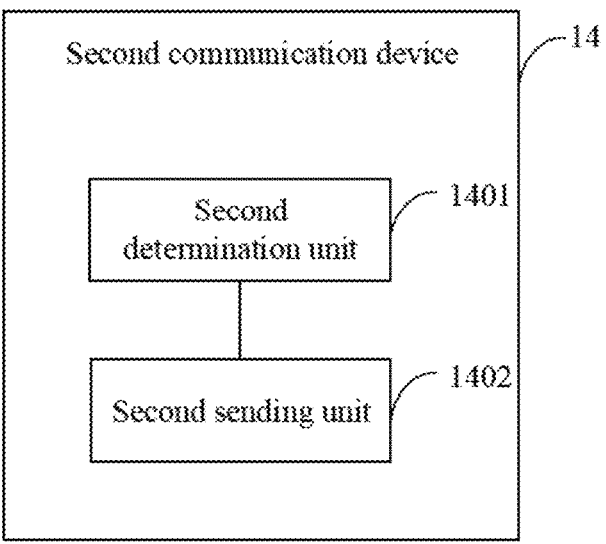
FIG. 14 illustrates a second schematic structural diagram of a communication device according to an embodiment of the present disclosure.

On the basis of foregoing embodiments, the embodiments of the present disclosure provide a communication device 14, corresponding to a method for data processing applied to a second communication device. FIG. 14 illustrates a second schematic diagram of a composition structure of the communication device provided by the embodiments of the present disclosure. The communication device 14 may include: a second determination unit 1401 and a second sending unit 1402.

The second determination unit 1401 is configured to determine at least one piece of configuration information. Each piece of the at least one piece of the first configuration information is used for configuring N split modes, N parts divided from the data, and a jth part corresponding to an ith split mode. N is an integer greater than or equal to 1, i is greater than or equal to 1 and less than or equal to N, j is greater than or equal to 1 and less than or equal to M, and M is an integer greater than 1.

The second sending unit 1402 is configured to send at least one piece of configuration information to the first communication device. The at least one piece of configuration information includes first configuration information.

In some embodiments of the present disclosure, the jth part is determined by at least one piece of the following information: a time domain period of the split mode, a time domain offset of the split mode, and a type of the data information:

The time domain period is used for indicating a time domain period of the jth part of data, the time domain offset is used for indicating a time domain position of the jth part in the time domain period, and the type of the data information is used for indicating whether the jth part is a critical data unit or a non-critical data unit.

In some embodiments of the present disclosure, the communication device further includes a second receiving unit.

The second receiving unit is configured to receive the available processing resource information sent by the first communication device.

The second determination unit 1401 is configured to determine the at least one piece of configuration information on the basis of the available processing resource information.

In some embodiments of the present disclosure, the second determination unit is configured to determine initial parameters corresponding to preset M split modes. M is an integer greater than or equal to 2, and each initial parameter is a natural number. The second determination unit is configured to continuously adjust the initial parameters on the basis of the preset processing resource quantities respectively occupied by the preset M split modes, so as to obtain an average processing resource quantity occupied by the preset M split modes; determine non-zero target parameters when the average processing resource quantity is matched with the available processing resource: determine N split modes corresponding to the target parameters from the preset M split modes; and determine the N split modes and the target parameters respectively corresponding to the N split modes as one piece of configuration information, so as to obtain the at least one piece of configuration information.

In some embodiments of the present disclosure, the communication device further includes a second acquisition unit.

The second acquisition unit is configured to acquire the type of the data information.

The second determination unit is configured to determine whether the jth part of the M parts of data is a critical data unit or a non-critical data unit on the basis of the type of the data information. If the jth part is the critical data unit, it is determined that the jth part corresponds to a critical split mode. If the jth part is the non-critical data unit, the configuration information is determined based on the split mode corresponding to the jth part of the M parts.

In some embodiments of the present disclosure, the second sending unit 1402 is configured to send scheduling information to the first communication device. The scheduling information is used for indicating second configuration information of the plurality of pieces of configuration information.

In some embodiments of the present disclosure, the communication device further includes a generation unit.

The second determination unit is configured to determine second configuration information on the basis of a state of a wireless channel with the first communication device and/or the updated available processing resource information sent by the first communication device.

The generation unit is configured to generate the scheduling information on the basis of the second configuration information.

The some embodiments of the present disclosure, in a case where the second communication device is a network device, the at least one piece of configuration information is carried in at least one piece of the following information: control channel information, Media Access Control Control Element (MAC CE) information, high-layer configuration signaling, and application layer control information, and is sent to the first communication device The communication device provided by the embodiments of the present disclosure may determine at least one piece of configuration information for the first communication device according to the available processing resources of the first communication device, and configure N split modes and parts of data corresponding to the N split modes in a data processing process through the configuration information, so that the N split modes are only applied in some parts of the data, and not the same split mode is used on the whole data fixedly. In this way, the N split modes are applied to some parts of the data to be processed, the processing resources occupied when the data to be processed is processed in the N split modes are matched with the available processing resources of the first communication device, which improves the balance of resource occupation in a data processing process and the resource utilization rate in the data processing process.

It is to be noted that: the division of the abovementioned units is only exemplary. In practical applications, the internal structure of the terminal can be divided into different units to complete all or part of the functions described above. In addition, the method for data processing provided by the abovementioned embodiments belong to the same concept, reference can be made to the method embodiments regarding the specific implementation process, which will not be elaborated herein.

Figure 15:
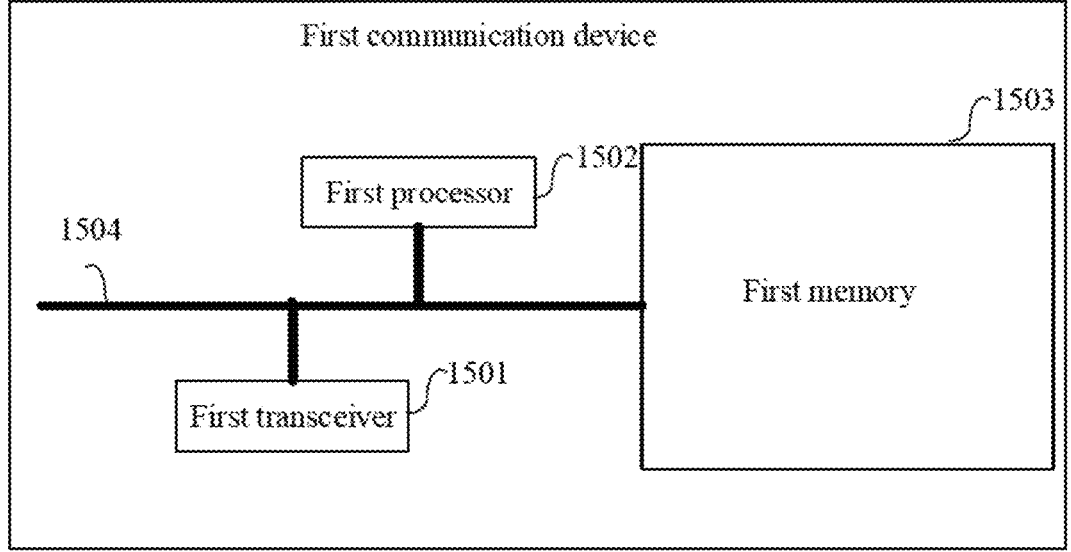
FIG. 15 illustrates a first schematic structural diagram of hardware of a communication device provided by an embodiment of the present disclosure.

Based on the hardware implementation of the abovementioned communication device, the embodiments of the present disclosure also provides a communication device, corresponding to a method for data processing applied to a first communication device. FIG. 15 illustrates a schematic diagram of the hardware composition structure of a terminal of the embodiments of the present disclosure. As shown in FIG. 15, the communication device includes a first transceiver 1501, a first processor 1502, and a first memory 1503 storing a computer program.

The first processor 1502 is configured to execute the operations of the method in the foregoing embodiments corresponding to FIG. 5 and FIG. 12 when running the computer program.

Of course, in practical applications, as shown in FIG. 15, various components in the communication device are coupled together through a bus system 1504. It is to be understood that the bus system 1504 is used to implement connection and communication between these components. In addition to a data bus, the bus system 1504 further includes a power bus, a control bus and a status signal bus. However, for clarity of description, various buses are marked as a bus system 1504 in FIG. 15.

Figure 16:
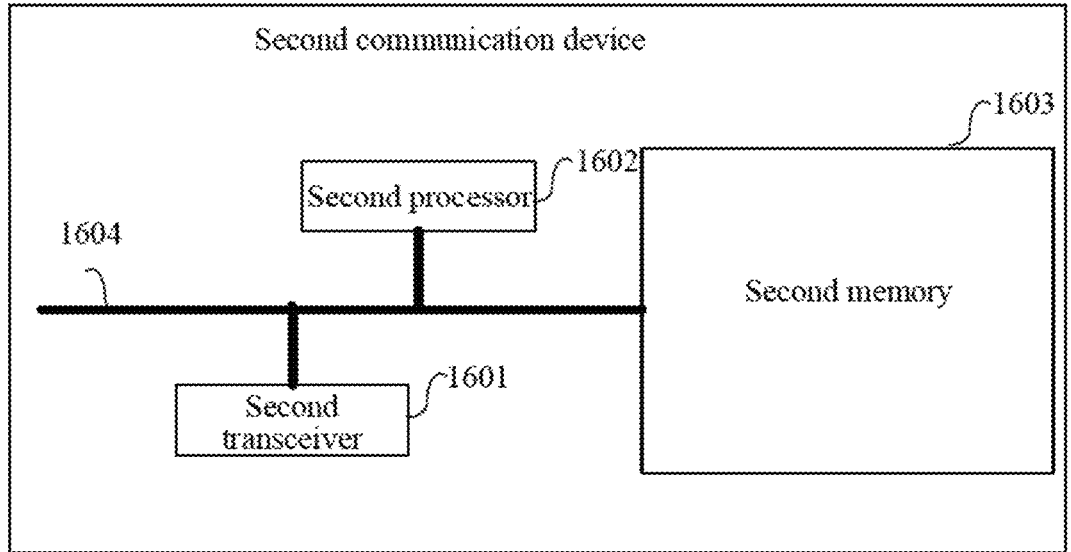
FIG. 16 illustrates a second schematic structural diagram of hardware of a communication device provided by an embodiment of the present disclosure.

Based on the hardware implementation of the abovementioned communication device, the embodiments of the present disclosure also provides a communication device, corresponding to a method for data processing applied to a second communication device. FIG. 16 illustrates a schematic diagram of the hardware composition structure of a terminal of the embodiments of the present disclosure. As shown in FIG. 16, the communication device includes a second transceiver 1601, a second processor 1602, and a second memory 1603 storing a computer program.

The second processor 1602 is configured to execute the operations of the method in the foregoing embodiments corresponding to FIG. 8 and FIG. 12 when running the computer program.

Of course, in practical applications, as shown in FIG. 16, various components in the communication device are coupled together through a bus system 1604. It is to be understood that the bus system 1604 is used to implement connection and communication between these components. In addition to a data bus, the bus system 1604 further includes a power bus, a control bus, and a state signal bus. However, for clarity of description, various buses are marked as a bus system 1604 in FIG. 16.

It may be understood that the memory in the present embodiments may be a volatile memory or a nonvolatile memory, or may include both a volatile memory and a nonvolatile memory. The non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, an optical disk or a Compact Disc Read-Only Memory (CD-ROM). The magnetic surface memory may be a disk memory or a tape memory. The volatile memory may be a Random Access Memory (RAM), which is used as an external cache. By way of exemplary but not restrictive limitation, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory described in the embodiments of the present disclosure is intended to include, but is not limited to, these and any other suitable types of memories.

The abovementioned method disclosed in the embodiments of the present disclosure may be applied to the processor, or may be implemented by the processor. The processor may be an integrated circuit chip having signal processing capability. In the implementation process, each operation of the above method may be completed by an integrated logic circuit of hardware in the processor or an instruction in the form of software. The above processor may be a general-purpose processor, a DSP, or other programmable logic devices, discrete gate or transistor logic devices, discrete hardware components, or the like. The processor may implement or execute various methods, operations, and logical block diagrams disclosed in the embodiments of the present disclosure. The general-purpose processor may be a microprocessor, or any conventional processor. Operations of the methods disclosed with reference to the embodiments of the present disclosure may be directly performed and accomplished by a hardware decoding processor, or may be performed and accomplished by a combination of hardware and software modules in the decoding processor. A software module may be located in a storage medium. The storage medium is located in the memory, and the processor reads information in the memory and completes the operations of the foregoing method in combination with hardware thereof.

The embodiments of the present disclosure further provide a computer storage medium, which is a computer readable storage medium. The computer readable storage medium stores a computer instruction. As a first implementation mode, when the computer storage medium is located at a terminal, the computer instruction, when executed by the processor, implement any operation in the abovementioned method for data processing of the embodiments of the present disclosure.

In several embodiments provided by the present disclosure, it is to be understood that the disclosed device and method may be implemented in other manners. The device embodiment described above is only schematic, and for example, division of the units is only logic function division, and other division manners may be adopted during practical implementation. For example, a plurality of units or components may be combined or integrated into another system, or some characteristics may be neglected or not executed. In addition, coupling or direct coupling or communication connection between displayed or discussed components may be indirect coupling or communication connection implemented through some interfaces, the device or the units, and may be electrical and mechanical or adopt other forms.

The abovementioned units described as separate parts may be or may not be physically separate, and the components shown as units may be or may not be physical elements. That is, the components may be located in one place or distributed to a plurality of network elements. Part or all of the units may be selected to achieve the objectives of the solutions of the embodiments according to practical requirements.

In addition, all functional units in the embodiments of the present disclosure may be integrated in one processing unit, or each unit may serve as a unit separately, or at least two units may be integrated in one unit. The abovementioned integrated units may be realized in the form of hardware or in the form of hardware and software functional units.

Those of ordinary skill in the art can understand that all or part of the operations of the abovementioned method embodiments may be completed through hardware associated with program instructions. The previously described program may be stored in a computer readable storage medium. The program, when executed, executes the operations including the abovementioned method embodiments. The previously described storage medium includes various media capable of storing program codes, such as a mobile storage device, a ROM, a RAM, a magnetic disk or a compact disc.

Alternatively, when implemented in form of software function module and sold or used as an independent product, the integrated unit of the present disclosure may also be stored in a computer readable storage medium. Based on such understanding, a substantial part of the technical solutions of the embodiments of the present disclosure or parts thereof making contributions to the related art may be embodied in a form of a software product. The computer software product is stored in a storage medium, including a plurality of instructions configured to enable an electronic device (which may be a personal computer, a server, a network device, or the like) to execute all or part of the method in each embodiment of the present disclosure. The foregoing storage medium includes: various media capable of storing program codes, such as the mobile storage device, the ROM, the RAM, the magnetic disc, or the compact disc.

It is to be noted that the technical solutions recorded in the embodiments of the present disclosure may be freely combined without conflicts.

The above descriptions are merely specific implementation modes of the present disclosure, but the scope of protection of the present disclosure is not limited thereto. Any variation or replacement readily figured out by a person skilled in the art within the technical scope disclosed in the present disclosure shall fall within the scope of protection of the present disclosure. Therefore, the scope of protection of the present disclosure should conform to the scope of protection of the claims.

The invention claimed is:

1. A method for data processing, executed by a first communication device, the method comprising:

sending available processing resource information to a second communication device external to the first communication device, wherein the available processing resource information comprises an available quantity of processing resources of the first communication device;

acquiring first configuration information from the second communication device, wherein:

the first configuration information is based on the available processing resource information, the first configuration information is used for configuring N split modes and a jth part of data corresponding to an ith split mode among the N split modes, N is an integer greater than or equal to 1, i is greater than or equal to 1 and less than or equal to N, j is greater than or equal to 1 and less than or equal to M, M is an integer greater than 1, the N split modes comprise a split mode for splitting a data processing model into at least two sub-processing models by presetting a split position; and processing the jth part of data by using the sub-processing model of the at least two sub-processing models corresponding to the ith split mode, wherein an average quantity of processing resources occupied by processing the jth part of data using the corresponding sub-processing model is matched with the available quantity of processing resources.

2. The method of claim 1, further comprising: before acquiring the first configuration information, receiving at least one piece of additional configuration information from the second communication device, wherein the first configuration information is contained in the at least one piece of additional configuration information.

3. The method of claim 2, further comprising: after receiving the at least one piece of additional configuration information, receiving, from the second communication device, scheduling information for indicating second configuration information from the at least one piece of additional configuration information.

4. The method of claim 1, wherein the available processing resource information comprises at least one of an available computing resource quantity, an available storage resource quantity, and an available electric quantity of the first communication device.

5. The method of claim 1, further comprising: after sending the available processing resource information to the second communication device, receiving updated available processing resource information in response to changes to available idle processing resource information; and sending the updated available processing resource information to the second communication device.

6. The method of claim 1, further comprising:

processing different parts of data by respective sub-processing models which are obtained by splitting the data processing model according to different split modes of the N split modes.

7. The method of claim 1, wherein the jth part of data is based on at least one piece of following information:

a time domain period of the split mode, a time domain offset of the split mode, and a type of data information, wherein:

the time domain period indicates a time domain period of the jth part of data, the time domain offset indicates a time domain position of the jth part in the time domain period, and the type of data information indicates whether the jth part is a critical data unit or a non-critical data unit.

8. A communication device, comprising:

a transceiver configured to receive available processing resource information from a first communication device external to the communication device, wherein the available processing resource information comprises an available quantity of processing resources of the first communication device;

a processor; and a memory storing a computer program, wherein:

the transceiver, the processor and the memory communicate with one another through a communication bus, the transceiver is configured to send at least one piece of configuration information to the first communication device, each piece of the at least one piece of configuration information is used for configuring N split modes and a jth part of data corresponding to an ith split mode among the N split modes, N is an integer greater than or equal to 1, i is greater than or equal to 1 and less than or equal to N, j is greater than or equal to 1 and less than or equal to M, M is an integer greater than 1, the N split modes comprise a split mode for splitting a data processing model into at least two sub-processing models by presetting a split position, the at least one piece of configuration information comprises first configuration information and is based on the available processing resource information of the first communication device, and an average quantity of processing resources occupied by processing the jth part of data by the first communication device using a sub-processing model of the at least two sub-processing models corresponding to the ith split mode is matched with the available quantity of processing resources.

9. The communication device of claim 8, wherein:

initial parameters respectively correspond to preset M split modes,

M is an integer greater than or equal to 2, each of the initial parameters is a natural number, an average processing resource quantity occupied by the preset M split modes is based on continuous adjustments to the initial parameters, the continuous adjustments are based on preset processing resource quantities respectively occupied by the preset M split modes, non-zero target parameters are based on the average processing resource quantity matching the available processing resource quantity, N split modes correspond to the non-zero target parameters from the preset M split modes, and the N split modes and the target parameters respectively correspond to the N split modes as the at least one piece of configuration information.

10. The communication device of claim 8, wherein the transceiver is further configured to:

receive a type of data information, wherein:

the jth part of M parts of data is a critical data unit or a non-critical data unit is based on the type of data information, the jth part corresponds to a critical split mode in response to the jth part being a critical data unit, the jth part corresponds to a non-critical split mode in response to the jth part being a non-critical data unit, and one piece of configuration information is based on the split mode corresponding to the jth part in the M parts of data.

11. The communication device of claim 8, wherein after the transceiver is configured to send the at least one piece of configuration information to the first communication device, the transceiver is configured to send scheduling information to the first communication device for indicating second configuration information of the at least one piece of configuration information.

12. The communication device of claim 11, wherein second configuration information is based on a state of a wireless channel with the first communication device and/or updated available processing resource information sent by the first communication device.

13. The communication device of claim 8, wherein in response to the communication device being a network device, the transceiver is further configured to send the at least one piece of configuration information to the first communication device, wherein the at least one piece of configuration information contains at least one piece of: control channel information, Media Access Control Control Element (MAC CE) information, and layer configuration signaling and application layer control information.

14. The communication device of claim 8, wherein different parts of data are processed by respective sub-processing models which are obtained by splitting the data processing model according to different split modes of the N split modes.

15. The communication device of claim 8, wherein the jth part of data is based on at least one piece of following information:

a time domain period of the split mode, a time domain offset of the split mode, and a type of data information, wherein:

the time domain period indicates a time domain period of the jth part of data, the time domain offset indicates a time domain position of the jth part in the time domain period, and the type of data information indicates whether the jth part is a critical data unit or a non-critical data unit.

16. A communication device, comprising:

a transceiver;

a processor, and a memory storing a computer program, wherein:

the transceiver, the processor and the memory communicate with one another through a communication bus, the transceiver is configured to send available processing resource information to another communication device external to the communication device, the available processing resource information comprises an available quantity of processing resources of the communication device, and the processor is configured to execute the computer program to implement:

acquiring first configuration information from the another communication device, wherein:

the first configuration information is based on the available processing resource information, the first configuration information is used for configuring N split modes and a jth part of data corresponding to an ith split mode among the N split modes, N is an integer greater than or equal to 1, i is greater than or equal to 1 and less than or equal to N, j is greater than or equal to 1 and less than or equal to M, M is an integer greater than 1, the N split modes comprise a split mode for splitting a data processing model into at least two subprocessing models by presetting a split position; and processing the jth part of data by using the subprocessing model of the at least two sub-processing models corresponding to the ith split mode, wherein an average quantity of processing resources occupied by processing the jth part of data using the corresponding sub-processing model is matched with the available quantity of processing resources.

17. The communication device of claim 16, wherein the processor is further configured to execute the computer program to implement: before acquiring the first configuration information, controlling the transceiver to receive at least one piece of additional configuration information, wherein the first configuration information is contained in the at least one piece of additional configuration information, and wherein the processor is further configured to execute the computer program to implement: after receiving the at least one piece of additional configuration information, controlling the transceiver to receive scheduling information for indicating second configuration information from the at least one piece of additional configuration information.

18. The communication device of claim 16, wherein:

the available processing resource information comprises at least one of an available computing resource quantity, an available storage resource quantity, and an available electric quantity of the communication device, and the first processor is further configured to execute the computer program to implement:

receiving updated available processing resource information in response to changes to available idle processing resource information; and controlling the first transceiver to send the updated available processing resource information to the another communication device.

19. The communication device of claim 16, wherein the first processor is further configured to execute the computer program to implement:

processing different parts of data by respective sub-processing models which are obtained by splitting the data processing model according to different split modes of the N split modes.

20. The communication device of claim 16, wherein the jth part of data is based on at least one piece of following information:

a time domain period of the split mode, a time domain offset of the split mode, and a type of data information, wherein:

the time domain period indicates a time domain period of the jth part of data, the time domain offset indicates a time domain position of the jth part in the time domain period, and the type of data information indicates whether the jth part is a critical data unit or a non-critical data unit.

\* \* \* \* \*